(12) United States Patent
Qu

(10) Patent No.: US 8,943,489 B1
(45) Date of Patent: *Jan. 27, 2015

(54) HIGH AVAILABILITY IN-SERVICE SOFTWARE UPGRADE USING VIRTUAL MACHINE INSTANCES IN DUAL COMPUTING APPLIANCES

(75) Inventor: Hui Qu, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/537,760

(22) Filed: Jun. 29, 2012

(51) Int. Cl.
G06F 9/44 (2006.01)

(52) U.S. Cl.
USPC .......................... 717/168; 717/170; 717/172

(58) Field of Classification Search
None
See application file for complete search history.

(56) References Cited

U.S. PATENT DOCUMENTS

| | | | |
|---|---|---|---|
| 7,003,692 B1 * | 2/2006 | Banks et al. ................. 714/12 |
| 7,185,106 B1 | 2/2007 | Moberg et al. |
| 7,275,081 B1 | 9/2007 | Katz et al. |
| 7,359,377 B1 | 4/2008 | Kompella et al. |
| 7,739,403 B1 * | 6/2010 | Balakrishna et al. ........ 709/242 |
| 7,804,769 B1 | 9/2010 | Tuplur et al. |
| 7,853,714 B1 | 12/2010 | Moberg et al. |
| 8,055,933 B2 * | 11/2011 | Jaehde et al. ................. 714/4.1 |
| 8,190,720 B1 * | 5/2012 | Yellai et al. .................. 709/221 |
| 8,245,217 B2 * | 8/2012 | Raman et al. ................. 717/170 |
| 8,291,258 B2 * | 10/2012 | Narayanaswamy et al. . 714/4.12 |
| 8,352,558 B2 * | 1/2013 | Boctor et al. ................. 709/206 |
| 8,495,618 B1 * | 7/2013 | Inbaraj et al. ................. 717/173 |
| 8,739,151 B1 * | 5/2014 | Racz et al. .................... 717/170 |
| 8,782,632 B1 * | 7/2014 | Chigurapati et al. ......... 717/172 |
| 8,806,472 B2 * | 8/2014 | Lynch et al. .................. 717/172 |
| 2002/0073135 A1 | 6/2002 | Meyer |
| 2003/0177209 A1 * | 9/2003 | Kwok et al. .................. 717/172 |
| 2005/0132351 A1 * | 6/2005 | Randall et al. ................ 717/168 |
| 2006/0233182 A1 * | 10/2006 | Appanna et al. .............. 370/401 |
| 2007/0067765 A1 * | 3/2007 | Motta et al. ................... 717/168 |
| 2007/0083723 A1 * | 4/2007 | Dey et al. ...................... 711/163 |
| 2007/0169083 A1 * | 7/2007 | Penubolu et al. .............. 717/168 |
| 2007/0169093 A1 * | 7/2007 | Logan et al. .................. 717/168 |
| 2007/0255764 A1 * | 11/2007 | Sonnier et al. ................ 707/203 |

(Continued)

OTHER PUBLICATIONS

Symantec, "Symantec Storage Foundation and High Availability Solutions 6.1 Virtualization Guide—AIX", Symantec Corporation, Jan. 2014, pp. 1-171; <http://www.symantec.com/business/ . . . DOCUMENTATION/6000/DOC6980/en_US/sfhas_virtualization_61_aix.pdf>.*

(Continued)

*Primary Examiner* — Thuy Dao
*Assistant Examiner* — Ben C Wang
(74) *Attorney, Agent, or Firm* — Schumaker & Sieffert, P.A.

(57) ABSTRACT

Techniques are described for providing high availability during an in-service software upgrade (ISSU) of an appliance within a network device, e.g., a router, by running a pair of virtual machines on each of a primary appliance and a secondary appliance within the router. Examples of the appliances include a routing engine within a router, and a service physical interface card (PIC) within a forwarding engine of a router. An ISSU of the primary appliance may first upgrade the operating system instance of a secondary virtual machine, switch operation from a primary virtual machine to the secondary virtual machine, and then upgrade the operating system instance on the primary virtual machine. During the ISSU of the primary appliance, primary and secondary virtual machines on the secondary appliance provide high availability to the virtual machine on the primary appliance executing the original operating system.

27 Claims, 10 Drawing Sheets

(56) References Cited

U.S. PATENT DOCUMENTS

| | | | | |
|---|---|---|---|---|
| 2007/0294686 | A1* | 12/2007 | Oh | 717/168 |
| 2008/0034365 | A1* | 2/2008 | Dahlstedt | 718/1 |
| 2008/0059959 | A1* | 3/2008 | Chen et al. | 717/168 |
| 2008/0148250 | A1* | 6/2008 | Motta | 717/170 |
| 2008/0244552 | A1* | 10/2008 | Toeroe | 717/168 |
| 2008/0244577 | A1* | 10/2008 | Le et al. | 718/1 |
| 2008/0295088 | A1* | 11/2008 | Bhat et al. | 717/170 |
| 2009/0089774 | A1* | 4/2009 | Lynch et al. | 717/173 |
| 2009/0100418 | A1* | 4/2009 | Raman et al. | 717/170 |
| 2009/0313617 | A1* | 12/2009 | Hung | 717/168 |
| 2009/0327648 | A1 | 12/2009 | Savagaonkar et al. | |
| 2010/0057843 | A1 | 3/2010 | Landsman et al. | |
| 2010/0115512 | A1 | 5/2010 | Sakai | |
| 2011/0173490 | A1* | 7/2011 | Narayanaswamy et al. | 714/4.11 |
| 2011/0173598 | A1* | 7/2011 | Cassapakis et al. | 717/168 |
| 2012/0072893 | A1* | 3/2012 | Gupta et al. | 717/168 |
| 2013/0042323 | A1* | 2/2013 | Narayanaswamy et al. | 726/23 |
| 2013/0145359 | A1* | 6/2013 | Hanselmann | 717/173 |
| 2013/0191340 | A1* | 7/2013 | Ammanur et al. | 707/638 |

OTHER PUBLICATIONS

Vanbever et al., "HotSwap: Correct and Efficient Controller Upgrades for Software-Defined Networks", 2013 ACM, HotSDN'13, Aug. 2013, Hong Kong, China, pp. 133-138; <http://dl.acm.org/results.cfm?h=1&source_query=&&cfid=417717926&cftoken=68174932>.*

Davoudian et al., "Ordering Upgrade Changes for Highly Available Component Based Systems", 2014 IEEE, HASE'14, Jan. 2014, pp. 259-260; <http://ieeexplore.ieee.org/stamp/stamp.jsp?tp=&arnumber=6754619>.*

U.S. Appl. No. 12/182,619 entitled Streamlined Packet Forwarding Using Dynamic Filters for Routing and Security in a Shared Forwarding Plane, filed Jul. 30, 2008.

U.S. Appl. No. 13/247,537 entitled High Availability In-Service Software Upgrade Using Virtual Machine Instances in Dual Control Units of a Network Device, filed Sep. 28, 2011.

Chandra et al. "Capabilities Advertisement with BGP-4", RFC 2842, Network Working Group, May 2000, 4pgs.

U.S. Appl. No. 12/857,207, entitled Configuration Update on Virtual Control Plane, filed Aug. 16, 2010.

U.S. Appl. No. 13/247,475, entitled In-Service Configuration Upgrade Using Virtual Machine Instances, filed Sep. 28, 2011.

U.S. Appl. No. 13/247,571, entitled High Availability Using Full Memory Replication Between Virtual Machine Instances on a Network Device, filed Sep. 28, 2011.

* cited by examiner

HIGH AVAILABILITY IN-SERVICE SOFTWARE UPGRADE USING VIRTUAL MACHINE INSTANCES IN DUAL COMPUTING APPLIANCES

TECHNICAL FIELD

Techniques of this disclosure relate generally to computer networks, and more particularly to software upgrade mechanisms for network devices.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, contain control units or routing engines that maintain routing information describing routes through the network. Each route defines a path between locations on the network. Large computer networks, such as the Internet, often include many routers that exchange routing information according to a defined routing protocol, such as the Border Gateway Protocol (BGP). From the routing information, a forwarding engine of the routers generates forwarding information, which is used by the routers to relay packet flows through the network and, more particularly to relay the packet flows to a next hop. Upon receiving an incoming packet, the router examines information within the packet to identify the destination for the packet. Based on the destination, the router forwards the packet in accordance with the forwarding information.

In some cases, an appliance within a router may fail due to a failure of either the operating system running on the appliance or the underlying hardware of the appliance. As a result of the failed router appliance, customers of the computer network may lose service, routing information may need to be updated throughout the computer network to establish routes around the failed router appliance, and/or forwarding information may need to be updated within the router to establish forwarding paths around the failed router appliance. As one solution, a secondary appliance may be used to provide high availability (HA) for the router during operation of a primary appliance. In this case, if the primary appliance within the router fails, the router may perform a graceful switchover to the secondary appliance. In order to provide HA, however, the primary appliance and the secondary appliance must be executing the same operating system. HA protection, therefore, typically cannot be provided during an in-service software upgrade (ISSU) of the primary appliance because, if the ISSU fails to complete, the secondary appliance will be running a different operating system than the primary appliance.

SUMMARY

In general, this disclosure includes techniques for providing high availability during an in-service software upgrade (ISSU) of an appliance within a network device, e.g., a router, by running a pair of virtual machines on each of a primary appliance and a secondary appliance within the router. In one example, a control unit or routing engine within a router may utilize a virtual machine executing on a hypervisor, instead of running directly on top of the hardware, to control routing functionality of the router. In another example, a service physical interface card (PIC) within a forwarding engine of a router may utilize a virtual machine executing on a hypervisor to control one or more network service applications, e.g., firewall services and packet processing services. Virtual machines make it possible for multiple instances of operating systems to run simultaneously on a single appliance of the router.

In the case of a router with dual appliances, e.g., dual routing engines or a pair of service PICs, one of the appliances may operate as a primary appliance and the other appliance may operate as a secondary appliance to provide high availability for the router. For example, when both of the appliances are running the same operating system, the dual appliances may enable a graceful switchover to the secondary appliance upon a failure of the primary appliance. After an operating system running on the primary appliance is upgraded, however, the appliances will be running different operating systems and the secondary appliance will no longer be able to provide high availability for the router.

According to the techniques of this disclosure, a primary virtual machine and a secondary virtual machine may be instantiated on the primary appliance, and a primary virtual machine and a secondary virtual machine may be instantiated on the secondary appliance. An ISSU of the primary appliance may first upgrade the operating system instance of the secondary virtual machine, switch operation from the primary virtual machine to the secondary virtual machine, and then upgrade the operating system instance on the primary virtual machine. During the ISSU of the primary appliance, the primary and secondary virtual machines on the secondary appliance provide high availability to the virtual machine on the primary appliance executing the original operating system. After completion of the ISSU of the primary appliance, the secondary virtual machine on the primary appliance may provide high availability for the primary virtual machine on the primary appliance during the ISSU of the secondary appliance.

In one example, the disclosure is directed toward a method comprising running a first primary virtual machine (VM) on a primary appliance of a network device, wherein the first primary VM executes a first operating system that controls functionality of the primary appliance, and running a second primary VM on a secondary appliance of the network device, wherein the second primary VM on the secondary appliance executes the first operating system and provides high availability for the primary appliance. The method further comprising, in response to receiving an ISSU request, initializing a first secondary VM on the primary appliance and a second secondary VM on the secondary appliance, wherein each of the first secondary VM and the second secondary VM execute the first operating system, and performing the ISSU on the primary appliance by upgrading the first secondary VM on the primary appliance to a second operating system, switching control of the primary appliance from the first primary VM to the first secondary VM, and upgrading the first primary VM to the second operating system, wherein the second primary VM executing the first operating system on the secondary appliance provides high availability for the primary appliance during the ISSU of the primary appliance.

In another example, the disclosure is directed toward a network device comprising a primary appliance, a secondary appliance, a first hypervisor that runs one or more virtual machines on the primary appliance, a second hypervisor that runs one or more virtual machines on the secondary appliance, a first primary virtual machine (VM) running on the primary appliance, wherein the first primary VM is configured to execute a first operating system that controls functionality of the primary appliance, and a second primary VM running on the secondary appliance, wherein the second primary VM is configured to execute the first operating system and provide high availability for the primary appliance. In addition, in response to receiving an ISSU request, the first hypervisor initializes a first secondary VM on the primary appliance and the second hypervisor initializes a second secondary VM on the secondary appliance, wherein each of the first secondary VM and the second secondary VM execute the first operating system, and wherein the first hypervisor performs the ISSU on the primary appliance to upgrade the first secondary VM to a second operating system, switch control of the primary appliance from the first primary VM to the first secondary VM, and upgrade the first primary VM to the second operating system, wherein the second primary VM executing the first operating system on the secondary appliance provides high availability for the primary appliance during the ISSU of the primary appliance.

In a further example, the disclosure is directed toward a non-transitory, computer-readable storage medium comprising instructions that cause one or more programmable processors to run a first primary virtual machine (VM) on a primary appliance of a network device, wherein the first primary VM executes a first operating system that controls functionality of the primary appliance, run a second primary VM on a secondary appliance of the network device, wherein the second primary VM on the secondary appliance executes the first operating system and provides high availability for the primary appliance, in response to receiving an ISSU request, initialize a first secondary VM on the primary appliance and a second secondary VM on the secondary appliance, wherein each of the first secondary VM and the second secondary VM execute the first operating system, and perform the ISSU on the primary appliance by upgrading the first secondary VM on the primary appliance to a second operating system, switch control of the primary appliance from the first primary VM to the first secondary VM, and upgrade the first primary VM to the second operating system, wherein the second primary VM executing the first operating system on the secondary appliance provides high availability for the primary appliance during the ISSU of the primary appliance.

The details of one or more examples of the invention are set forth in the accompanying drawings and the description below. Other features, objects, and advantages of the invention will be apparent from the description and drawings, and from the claims.

DETAILED DESCRIPTION

Figure 1:
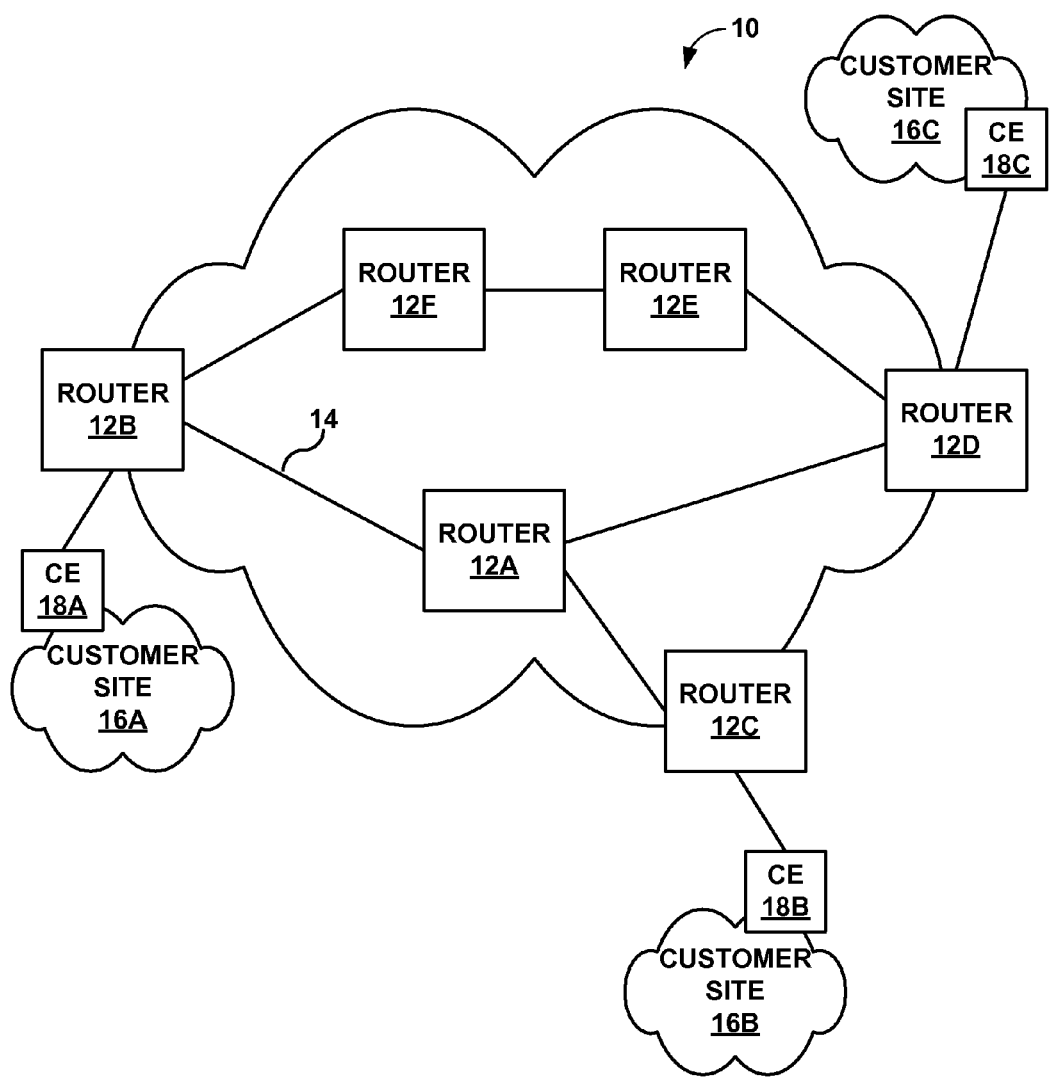
FIG. 1 is a block diagram illustrating an example computer network comprising one or more routers with dual appliances configured to provide high availability for the router during an in-service software upgrade of the appliances.

FIG. 1 is a block diagram illustrating an example computer network 10 in which one or more of routers 12A-12F ("routers 12") includes dual appliances configured to provide high availability for the router during an in-service software upgrade of the appliances. In some cases, an appliance within one of routers 12 may fail due to a failure of either the operating system running on the appliance or the underlying hardware of the appliance. As one solution, a secondary appliance may be used to provide high availability (HA) for the one of routers 12 during operation of a primary appliance. In order to provide HA, however, the primary appliance and the secondary appliance must be executing the same operating system. HA protection, therefore, typically cannot be provided during an in-service software upgrade (ISSU) of the primary appliance to a different operating system. The techniques of this disclosure enable secondary appliances to provide high availability to primary appliances within the one or more of routers 12 even during an ISSU of the primary appliances.

The dual appliances in one or more of routers 12 may comprise dual routing engines and/or a pair of service physical interface cards (PICs). As a result of a failed routing engine in one of routers 12, for example, packet forwarding to customer networks 16A-16C ("customer networks 16") may be disrupted while routing information is updated across network 10 to establish routes around the failed routing engine within the one of routers 12. As a result of a failed service PIC within one of router 12, as another example, performance of network services, such as firewall services and packet processing services, may be disrupted while forwarding information is updated within the one of the routers 12 to establish forwarding paths around the failed service PIC. To avoid these disruptions, the techniques of this disclosure provide high availability to primary appliances within the one or more of routers 12 during ISSU of the primary appliances by running a pair of virtual machines on each of the primary appliance and the secondary appliance within the one of routers 12.

Computer network 10 may comprise the Internet or another public network. In some cases, network 10 may comprise a multi-protocol label switching (MPLS) network. In the illustrated example, network 10 includes routers 12, some of which may comprise edge routers (e.g., router 12B, 12C and 12D) and some of which may comprise core network routers (e.g., router 12A, 12E and 12F). Each of the edge routers 12B, 12C, and 12D couples to one or more remote customer sites 16A-16C ("customer sites 16") via customer edge (CE) routers 18A-18C ("CE routers 18"). For example, router 12B is coupled to customer site 16A via CE router 18A, router 12C is coupled to customer site 16B via CE router 18B, and router 12D is coupled to customer site 16C via CE router 18C.

Each of customer sites 16 may include a local area network (LAN) or a wide area network (WAN) that comprises a plurality of subscriber devices, such as desktop computers, laptops, workstations, PDAs, wireless devices, network-ready appliances, file servers, print servers or other devices. In some cases, one or more of customer sites 16 may be connected in a customer network across computer network 10 to enable customer sites 16 to securely share data over network 10. For example, the customer network may comprise a separate multicast service instance, such as a multicast virtual private network (MVPN) or a virtual private LAN service (VPLS).

In the illustrated example of FIG. 1, routers 12 are connected to each other via network paths, such as network path 14 between router 12A and router 12B. In some cases, one or more routers 12 may establish a label switched path (LSP) within network 10 that connects all of routers 12 to one each other. Each of routers 12 includes at least one routing engine that maintains routing information describing the routes or paths through network 10. A routing engine within one of routers 12 may utilize a virtual machine executing on a hypervisor, instead of running directly on top of the hardware, to control routing functionality of the router. This makes it possible for multiple instances of operating systems to run simultaneously on a single routing engine. In some cases, router 12 may exchange routing information with each other according to a defined routing protocol, such as the Border Gateway Protocol (BGP).

Each of routers 12 may also include one or more service PICs within a forwarding engine that perform network services, such as firewall services and packet processing services including intrusion detection and prevention (IDP), packet flow monitoring, authentication services, and the like. Each of routers 12 may include forwarding paths to the service PICs in the forwarding information for the router. A service PIC within one of routers 12 may utilize a virtual machine executing on a hypervisor, instead of running directly on top of the hardware, to operate network services for the router. This makes it possible for multiple instances of embedded operating systems to run simultaneously on a single service PIC.

From the routing information maintained by the routing engine, each of routers 12 generates forwarding information used to relay packets within the router and through network 10. Upon receiving an incoming packet, router 12A, for example, examines information within the packet to identify the destination for the packet, and then forwards the packet toward the destination in accordance with the forwarding information. As one example, router 12A may receive a packet from router 12C and, based on the forwarding information, forwards the packet to a neighboring router, such as router 12B, over network path 14. As another example, router 12A may receive a packet from router 12C and, based on the forwarding information, forwards the packet to one of the service PICs within router 12A to perform network services on the packet.

In some cases, an appliance within one of routers 12 may fail due to a failure of either the operating system running on the appliance or the underlying hardware of the appliance. In order to avoid a total failure of the router, one or more of routers 12 may include dual appliances. In this case, a secondary appliance may be used to provide high availability for the router during operation by a primary appliance. The high availability of the router enables a graceful switchover from the primary appliance to the secondary appliance if the primary appliance fails. In order to provide high availability, however, the primary appliance and the secondary appliance must be running the same operating system. Conventionally, high availability protection cannot be provided during an ISSU of the primary appliance because, if the ISSU fails to complete, the secondary appliance will be running a different operating system than the primary appliance.

The techniques described in this disclosure enable the secondary appliance to provide high availability for the one of routers 12 while performing an ISSU of the primary appliance by running a pair of virtual machines on each of the primary appliance and secondary appliance within the one of routers 12. Examples of ISSUs that may be performed on the appliances within each of routers 12 include upgrading or replacing the operating system, adding support for new routing protocols, adding support for new network service applications, adding support for new features, fixing bugs without shutting down (i.e., hotspot bug fixing), saving/restoring routing states and forwarding states, taking a snapshot of routing states and forwarding states at a particular point in time, restoring a routing session based on a snapshot, and restarting routing engines or service PICs.

In one example, router 12A includes dual appliances, e.g., dual routing engines or a pair of service PICs, with a primary virtual machine running on a primary appliance and a primary virtual machine running on a secondary appliance. The primary virtual machine on the primary appliance and the primary virtual machine on the secondary appliance may be executing the same operating system such that the primary virtual machine on the secondary appliance provides high availability for router 12A during operation by the primary virtual machine on the primary appliance. Upon receiving a request for an ISSU of router 12A, a secondary virtual machine may be initialized on the primary appliance and a secondary virtual machine may be initialized on the secondary appliance. The ISSU of the primary appliance may then be performed by installing an upgraded operating system in the secondary virtual machine on the primary routing engine, switching operation for router 12A from the primary virtual machine to the second virtual machine on the primary appliance, and then installing the upgraded operating system on the primary virtual machine.

During the ISSU of the primary appliance, the primary and secondary virtual machines on the secondary appliance may both be executing the original operating system. In this way, the primary virtual machine on the secondary appliance may continue to provide high availability for the virtual machine on the primary appliance that is executing the original operating system during the ISSU of the primary appliance. If the ISSU of the primary appliance fails before completion such that the primary virtual machine and the secondary virtual machine on the primary appliance are executing different operating systems, control for router 12A may be switched to the primary virtual machine on the secondary appliance. After the switchover, the secondary virtual machine on the secondary appliance may provide high availability for router 12A during operation by the primary virtual machine on the secondary appliance. Similarly, the primary and secondary virtual machines on the primary appliance may provide high availability for router 12A during the ISSU of the secondary appliance.

The primary virtual machine on the primary appliance of router 12A may control the ISSU process described in this disclosure. In this example, the primary virtual machine operates as a master virtual machine and the secondary virtual machine operates as a backup virtual machine that synchronizes with the primary virtual machine. In addition, the primary virtual machine on the secondary appliance operates as a backup virtual machine that synchronizes with the primary virtual machine on the primary appliance. The primary virtual machine on the secondary appliance also operates as a master virtual machine of the secondary appliance, and the secondary virtual machine on the secondary appliance operates as a backup virtual machine that synchronizes with the primary virtual machine on the secondary appliance.

The techniques disclosed include performing an ISSU of an appliance within one of routers 12 with high availability during which the appliance being updated remains in service. In one example, a primary routing engine of router 12A simultaneously processes an ISSU and continues to forward incoming packets to neighboring routers on the network 10. In another example, a primary service PIC of router 12A simultaneously processes an ISSU and continues to perform network service on incoming packets within router 12A. The techniques are typically described in this disclosure with respect to routers, but the techniques may also be applied to network devices other than routers. Additionally, the techniques are generally described in this disclosure with respect to dual routing engines or pairs of service PICs within a router or network device. The techniques, however, may be applied to any other dual appliances within a router or network device that are capable of providing an operating environment in which to execute pairs of virtual machines.

Figure 2:
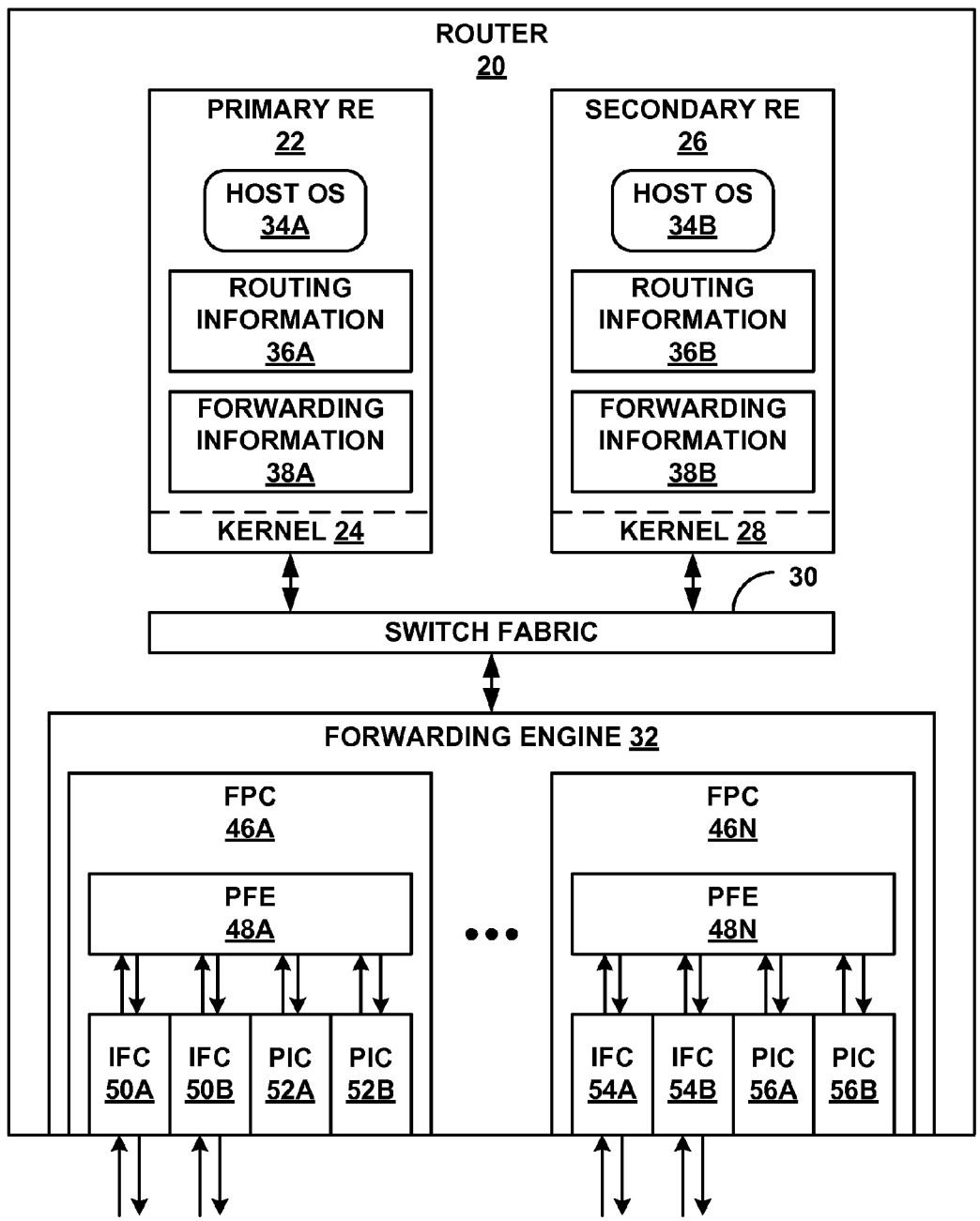
FIG. 2 is a block diagram illustrating a router with dual routing engines and pairs of service physical interface cards capable of implementing the techniques of this disclosure.

FIG. 2 is a block diagram illustrating a router 20 with dual routing engines 22, 26 and pairs of service PICs, 52A, 52B and 56A, 56B capable of implementing the techniques of this disclosure. Router 20 may operate substantially similar to any of routers 12A-12F from FIG. 1. For example, router 20 comprises a primary routing engine (RE) 22 and a secondary RE 26. The techniques of this disclosure provide high availability during an in-service software upgrade of primary RE 22 by running a pair of virtual machines on each of primary RE 22 and secondary RE 26. As another example, router 20 comprises at least one pair of service PICs, e.g., a primary service PIC 52A and a secondary service PIC 52B. The techniques of this disclosure also provide high availability during an in-service software upgrade of primary service PIC 52A by running a pair of virtual machines on each of primary service PIC 52A and secondary service PIC 52B.

In the illustrated example of FIG. 2, router 20 comprises primary RE 22 that performs routing functionality for router 20, and a secondary RE 26 that operates as a backup RE for router 20. Router 20 also includes a switch fabric 30 interconnecting a set of flexible PIC concentrators 46A-46N ("FPCs 46") within a forwarding engine 32. Each of FPCs 46 includes at least one of packet forwarding engines 48A-48N ("PFEs 48") that send and receive traffic by a set of interface cards that typically have one or more physical network interfaces (i.e., ports). For example, PFE 48A communicates packets with neighboring routers via IFCs 50A-50B ("IFCs 50") and PFE 48N communicates packets with neighboring routers via IFCs 54A-54B ("IFCs 54"). In some cases, PFEs 48 may communicate packets received via the IFCs to service PICs within FPCs 46 to perform network services on the packets. For example, PFE 48A may communicate packets to and from service PICs 52A-52B ("service PICs 52") and PFE 48N may communicate packet to and from service PICs 56A-56B ("service PICs 56").

Primary RE 22 includes kernel 24 and host operating system (OS) 34A to provide an operating environment for various protocols and daemons that perform routing functions for router 20. For example, one or more daemons may execute on top of kernel 24 to maintain and update routing information 36A, and create forwarding information 38A for installation to PFEs 48, among other functions. Similarly, secondary RE 26 includes kernel 28 and host OS 34B to provide an operating environment for various protocols and daemons. Secondary RE 26 may not perform routing functions for router 20, but instead operates solely as a backup for primary RE 22 in order to take over control of the routing functions for router 20 if primary RE 22 fails.

Kernels 24 and 28 may each comprise, for example, a UNIX operating system derivative such as Linux or Berkeley Software Distribution (BSD). Kernel 24 offers libraries and drivers by which the operating environment may interact with PFEs 48 in forwarding engine 32. Kernel 28 may also offer libraries and drivers by which the operating environment may interact with PFEs 48 in forwarding engine 32 upon failure of primary RE 22.

Primary RE 22 controls routing functionality and other functions on behalf of router 20. Primary RE 22 may implement one or more routing protocols, tunneling protocols, and label switching protocols, such as BGP, IS-IS, RSVP-TE and LDP, or other protocols. Primary RE 22 uses protocols to perform a variety of functions, such as to exchange routing information, to establish VPNs or LSPs, and for exchanging labels. For example, primary RE 22 may implement a protocol to establish at least one routing communication session with neighboring routers in a network in order to exchange routing information. Based on the learned routing information, primary RE 22 maintains and updates routing information 36 to describe a topology of a network, and more particularly, routes through the network.

Primary RE 22 analyzes its stored routing information 36A and generates forwarding information 38A for PFEs 48 in forwarding engine 32. Primary RE 22 typically processes routing information 36A to perform route selection and generate forwarding information 38A based on the selected routes. In this way, routes as well as labeling information may be stored into PFEs 48 in forwarding engine 32. PFEs 48 may associate, for example, network destinations with specific next hops. Primary RE 22 may generate forwarding information 38A in the form of a radix tree having leaf nodes that represent destinations within the network. When forwarding a packet, PFE 48A, for example, traverses the radix tree to a leaf node based on information within a header of the packet to ultimately select a next hop and output interface to which to forward the packet. PFE 48A then forwards the packet to a neighboring router via the selected one of IFCs 50, or to the selected one of service PICs 52 to perform network services on the packet.

A hardware environment of primary RE 22 may include a microprocessor (not shown in FIG. 2) that executes program instructions in order to execute both kernel 24 and the operating environment of primary RE 22. Similarly, a hardware environment of secondary RE 26 may also include a microprocessor (not shown in FIG. 2) that executes program instructions in order to execute both kernel 28 and the operating environment of secondary RE 26. The microprocessors may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Although not shown in FIG. 2, PFEs 48 may each comprise a central processing unit (CPU), memory and one or more programmable packet-forwarding application-specific integrated circuits (ASICs). Switch fabric 30 provides a high-speed interconnect for forwarding incoming data packets between PFEs 48 for transmission over a network.

The architecture of router 20 illustrated in FIG. 2 is shown for exemplary purposes only. The disclosure is not limited to this architecture. In other embodiments, router 20 may be configured in a variety of ways. In one embodiment, for example, some of the functionally of primary RE 22 may be distributed within PFEs 48. The operating environment of primary RE 22 may be implemented solely in software or hardware, or may be implemented as a combination of software, hardware or firmware. For example, primary RE 22 may include one or more processors that execute software instructions. In that case, primary RE 22 may include various software modules or daemons executing on host OS 34, and may include a non-transitory computer-readable storage device, such as computer memory or hard disk, for storing executable instructions.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 20, e.g., protocols. Primary RE 22, in some examples, retrieves and executes the instructions from memory for these aspects.

In the example of FIG. 2, primary RE 22 executes host OS 34A, and secondary RE 26 executes host OS 34B, which is an instance of the same operating system executed by primary RE 22. As a backup RE, secondary RE 26 may continually synchronize with primary RE 22 via a connection, e.g., an Ethernet connection, to update routing information 36B and forwarding information 38B on secondary RE 26 with routing information 36A and forwarding information 38A on primary RE 22.

If primary RE 22 were to fail due to a software failure of host OS 34A or a hardware failure of primary RE 22, secondary RE 26 may take over control of the routing session. In this way, secondary RE 26 may provide high availability to router 20 during operation of the routing session by primary RE 22. Example techniques for synchronizing state information between a primary RE and a backup RE are described in U.S. Pat. No. 7,275,081 to Katz, et al., entitled "Managing State Information in a Computing Environment" and U.S. Pat. No. 7,739,403 to Balakrishna et al., entitled "Synchronizing State Information Between Control Units," both of which are incorporated herein by reference.

When both primary RE 22 and second RE 26 are running the same operating system, i.e., host OS 34A, 34B, the dual routing engines may enable a graceful switchover to secondary RE 26 upon a failure of primary RE 22. After an ISSU of the host OS running on primary RE 22 is upgraded, however, secondary RE 26 will be running a different operating system than primary RE 22 and will no longer be able to provide high availability for primary RE 22.

The techniques described in this disclosure may continue to provide high availability during an ISSU of primary RE 22 by running a pair of virtual machines on each of primary RE 22 and secondary RE 22. More specifically, a primary virtual machine and a secondary virtual machine may be installed on primary RE 22 and a primary virtual machine and a secondary virtual machine may be installed on secondary RE 26. An ISSU of primary RE 22 may first upgrade the operating system instance of the secondary virtual machine, switch operation from the primary virtual machine to the secondary virtual machine, and then upgrade the operating system instance on the primary virtual machine. During the ISSU of primary RE 22, the primary and secondary virtual machines on secondary RE 26 provide high availability to the virtual machine on primary RE 22 executing the original operating system. After completion of the ISSU of primary RE 22, the secondary virtual machine on primary RE 22 may provide high availability for the primary virtual machine on primary RE 22 during the ISSU of secondary RE 26. The techniques for performing an ISSU with high availability on dual routing engines are described in more detail in U.S. patent application Ser. No. 13/247,537, entitled "High Availability In-Service Software Upgrade Using Virtual Machine Instances in Dual Control Units of a Network Device," which is incorporated herein by reference.

As illustrated in FIG. 2, at least some of FPCs 46 of forwarding engine 32 include pairs of service PICs, e.g., service PICs 52 within FPC 46A and service PICs 56 within FPC 46N. According to the techniques of this disclosure, the pairs of service PICs may be configured such that a primary service PIC performs network services on received packets, and a secondary service PIC operates as a backup service PIC for the primary service PIC. In other examples, each of FPCs 46 may include one or more pairs of service PICs that include one primary service PIC and one backup service PIC. In that case, the techniques of this disclosure may be applied to each pair of service PICs within each of FPCs 46 to enable an ISSU of the pair of service PICs with high availability.

Each of service PICs 52, 56 within router 20 provides an operating environment for one or more network service applications. The operating environment may comprise a kernel and an embedded operating system running directly over hardware of the service PIC or within a virtual machine over a hypervisor for the service PIC. The kernel may comprise, for example, a UNIX operating system derivative such as Linux or Berkeley Software Distribution (BSD). The network service applications running on service PICs 52, 56 may provide network services such as firewall services and packet processing services including IDP, packet flow monitoring, authentication services, and the like.

PFEs 48 in router 20 may relay packets received from neighboring routers via IFCs 50, 54 to and from service PICs 52, 56 and, in turn, to and from the network service applications running on the service PICs. To relay packets to and from service PICs 52, 56, router 20 may assign an IP address and construct input and output logical interfaces for each network service application running on service PICs 52, 56. PFE 48A, for example, may associate the input and output logical interfaces for the network service applications with the IP addresses of the network service applications in forwarding information 38A for PFE 48A. For example, a destination address of a packet received by PFE 48A via one of IFCs 50 may correspond to an IP address assigned to a respective one of the network service applications running on PICs 52. In this manner, PFE 48A may forward the received packet to the one of the network service applications on service PICs 52 in a manner similar to forwarding packets on physical IFCs 50 to neighboring routers in the network. Example techniques of providing network services via service cards are described in U.S. Pat. No. 7,185,106, entitled "Providing Services for Multiple Virtual Private Networks," and in U.S. Pat. No. 7,853,714, also entitled "Providing Services for Multiple Virtual Private Networks," both of which are incorporated herein by reference.

Similar to primary RE 22 and secondary RE 26 described above, a primary service PIC 52A may execute a host OS and operate the network service applications for the pair of service PICs 52 on FPC 46A. A secondary service PIC 52B may execute a host OS, which is an instance of the same operating system executed by primary service PIC 52A, but may not operate network service applications. Secondary service PIC 52B may instead operate solely as a backup service PIC to primary service PIC 52A to take over operation of the network service applications if primary service PIC 52A fails.

In this way, secondary service PIC 52B may provide high availability to primary service PIC 52A during operation of the network services by primary service PIC 52A. When both primary service PIC 52A and secondary service PIC 52B are running the same operating system, the pair of service PICs 52 may enable a graceful switchover to secondary service PIC 52B upon a failure of primary service PIC 52A. After an ISSU of the host OS running on primary service PIC 52A is upgraded, however, secondary service PIC 52B will be running a different operating system than primary service PIC 52A and will no longer be able to provide high availability for primary service PIC 52A.

The techniques described in this disclosure may continue to provide high availability during an ISSU of primary service PIC 52A by running a pair of virtual machines on each of primary service PIC 52A and secondary service PIC 52B. More specifically, a primary virtual machine and a secondary virtual machine may be installed on primary service PIC 52A and a primary virtual machine and a secondary virtual machine may be installed on secondary service PIC 52B. An ISSU of primary service PIC 52A may first upgrade the operating system instance of the secondary virtual machine, switch operation from the primary virtual machine to the secondary virtual machine, and then upgrade the operating system instance on the primary virtual machine. During the ISSU of primary service PIC 52A, the primary and secondary virtual machines on secondary service PIC 52B provide high availability to the virtual machine on primary service PIC 52A executing the original operating system. After completion of the ISSU of primary service PIC 52A, the secondary virtual machine on primary service PIC 52A may provide high availability for the primary virtual machine on primary service PIC 52A during the ISSU of secondary service PIC 52B. The techniques for performing an ISSU with high availability on a pair of service PICs 52 are described in more detail below with respect to FIGS. 3A-3F.

FIGS. 3A-3F are block diagrams illustrating primary service PIC 52A and secondary service PIC 52B of router 20 at different stages of an in-service software upgrade with high availability. As illustrated in FIGS. 3A-3F, primary and secondary service PICs 52 are connected via PFE 48A, which is in turn connected to kernel 24 of primary RE 22 via switch fabric 30. In the illustrated example, primary RE 22 includes a virtual machine (VM) manager 58 capable of initializing, terminating, and otherwise managing virtual machine instances within primary RE 22 and within service PICs 52. VM manager 58 manages the virtual machine instances through a hypervisor, e.g., a hypervisor within primary RE 22 (not shown), hypervisor 68 within service PIC 52A, or hypervisor 70 within service PIC 52B. In some cases, VM manager 58 may be incorporated in a hypervisor within primary RE 22. In still other examples, each of service PICs 52 may have a separate VM manager. This example is described in more detail with respect to FIG. 4.

Figure 3A:
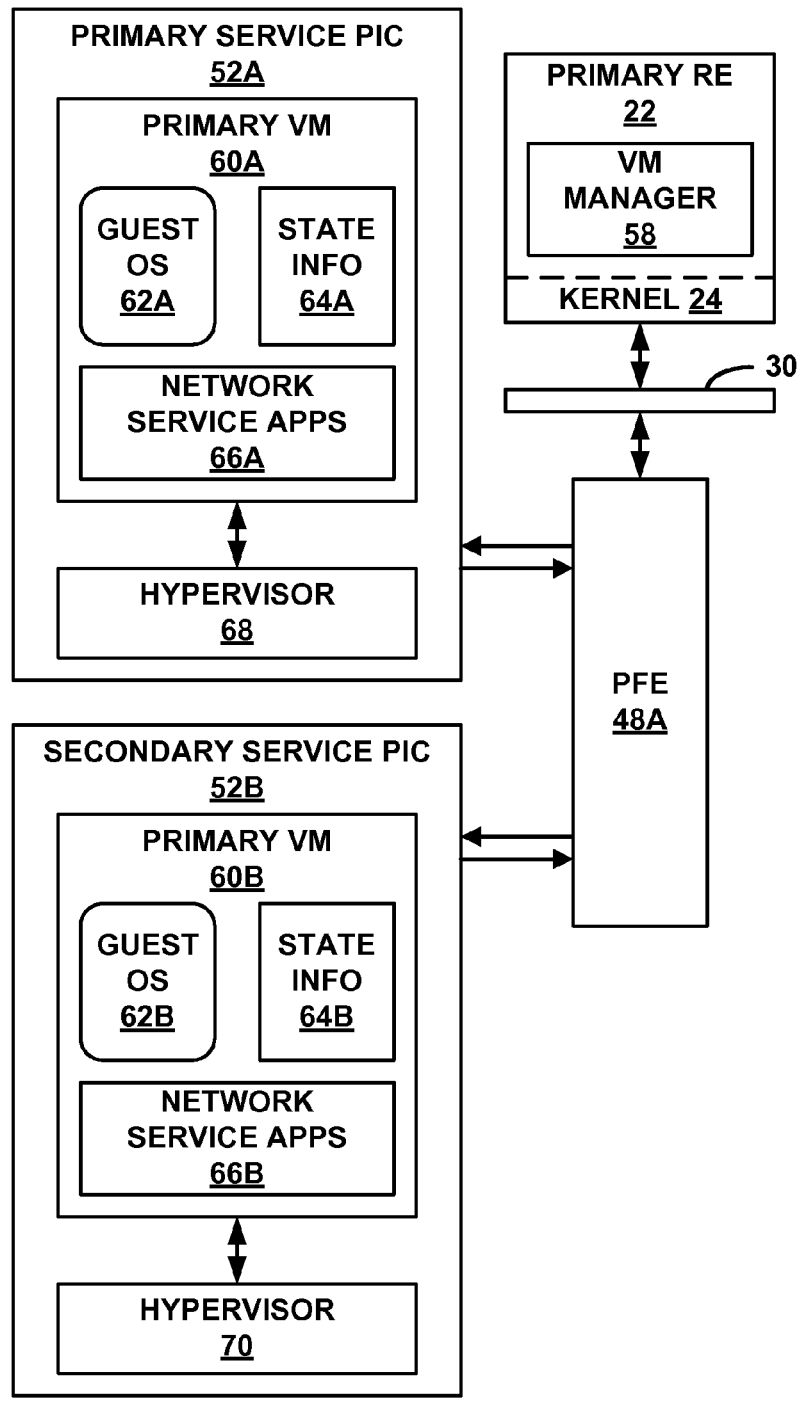
FIGS. 3A-3F are block diagrams illustrating an example of a primary service physical interface card and a secondary service physical interface card of a router at different stages of an in-service software upgrade with high availability.

FIG. 3A illustrates primary service PIC 52A of router 20 including a primary VM 60A and secondary service PIC 52B including a primary VM 60B. Primary VM 60A on primary service PIC 52A and primary VM 60B on secondary service PIC 52B may have a master/backup relationship. For example, primary VM 60A may be configured by VM manager 58 via hypervisor 68 to operate as the master virtual machine for the pair of service PICs 52 upon start-up on primary service PIC 52A. Similarly, primary VM 60B may be configured by VM manager 58 via hypervisor 70 to operate as the backup virtual machine for the pair of service PICs 52 upon start-up on secondary service PIC 52B.

Hypervisor 68 executes on the platform of primary service PIC 52A to provide an operating environment for one or more virtual machines on primary service PIC 52A, and hypervisor 70 executes on the platform of secondary service PIC 52B to provide an operating environment for one or more virtual machines on secondary service PIC 52B. Through hypervisor 68, router 20 has the capability to concurrently run a plurality of virtual machines, each with its own unique operating system, on primary service PIC 52A. Similarly, through hypervisor 70, router 20 has the capability to concurrently run a plurality of virtual machines, each with its own unique operating system, on secondary service PIC 52B. Each of hypervisors 68, 70 may, for example, be a proprietary program such as VMWARE® or an open source solution.

In the example of FIG. 3A, primary VM 60A on primary service PIC 52A executes a guest OS 62A, such as an instance of an embedded version of a network device operating system. As the primary virtual machine for the pair of service PICs 52, primary VM 60A on primary service PIC 52A operates network service applications 66A, such as firewall services and packet processing services including IDP, packet flow monitoring, authentication services, and the like, for packets received by PFE 48A via IFCs 50.

Primary VM 60B in secondary service PIC 52B executes a guest OS 62B, which is an instance of the same operating system executed by primary VM 60A on primary service PIC 52A. As the backup virtual machine, primary VM 60B on secondary service PIC 52B may continually synchronize with primary VM 60A on primary service PIC 52A. In the illustrated example of FIG. 3A, primary VM 60B on secondary service PIC 52B may synchronize with primary VM 60A on primary service PIC 52A via PFE 48A to update state information 64B and network service applications 66B based on state information 64A and network service applications 66A from primary VM 60A on primary service PIC 52A.

If primary VM 60A on primary service PIC 52A were to fail due to a software failure of guest OS 62A or a hardware failure of primary service PIC 52A, primary VM 60B on secondary service PIC 52B may take over operation of the network services. In this way, primary VM 60B on secondary service PIC 52B may provide high availability primary service PIC 52A during operation of the network services by primary VM 60A on primary service PIC 52A. As described above, primary VM 60B on secondary service PIC 52B may not provide high availability to primary service PIC 52A if primary VM 60B on secondary service PIC 52B is running a different operating system than primary VM 60A on primary service PIC 52A. High availability, therefore, may not be provided during ISSU of the pair of service PICs 52, because, if the ISSU fails to complete, primary VM 60B on secondary service PIC 52B will be running a different operating system than primary VM 60A on primary service PIC 52A. The techniques described in this disclosure continue to provide high availability during an ISSU of the pair of service PICs 52 by running a pair of virtual machines on each of primary service PIC 52A and secondary service PIC 52B.

Figure 3B:
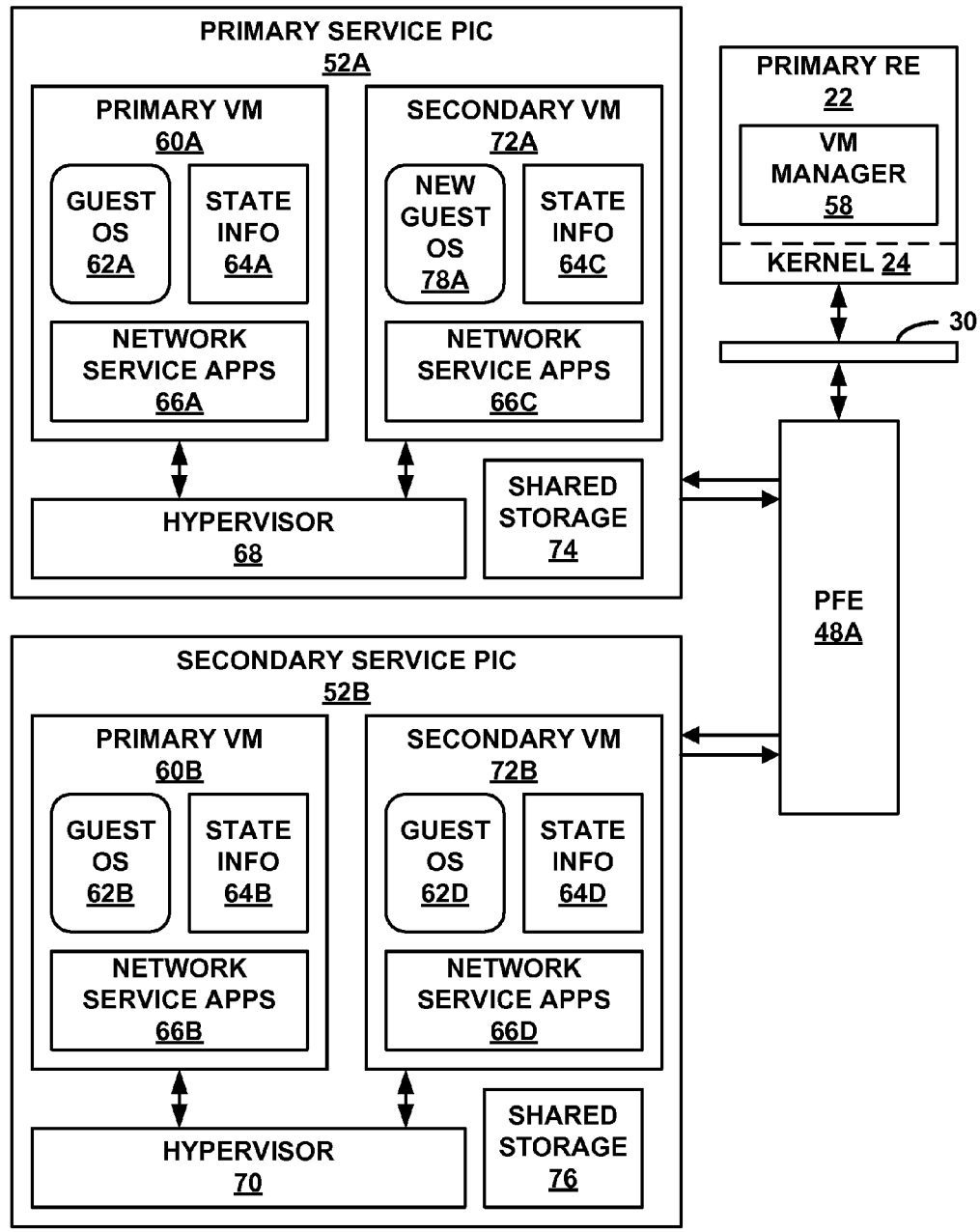

FIG. 3B illustrates primary service PIC 52A of router 20 comprising primary VM 60A and secondary VM 72A during an ISSU of primary service PIC 52A. FIG. 3B also illustrates secondary service PIC 52B comprising primary VM 60B and secondary VM 72B. As described above with respect to FIG. 3A, router 20 may be configured to run one or more virtual machines on primary service PIC 52A through hypervisor 68, and configured to run one or more virtual machines on secondary service PIC 52B through hypervisor 70.

Before, during, and after an ISSU process on service PICs 52, VM manager 58 may use keep-alive or heartbeat mechanisms to monitor the health of the virtual machines on both primary service PIC 52A and secondary service PIC 52B. More specifically, the heartbeat mechanisms may detect a failure of one or more of the virtual machines 60A, 60B, 72A and 72B. If a failure is detected on primary VM 60A on primary service PIC 52A, for example, VM manager 58 may direct hypervisor 68 to switch operation of the network services to secondary VM 72A on primary service PIC 52A, or VM manager 58 may communicate with both hypervisor 68 and hypervisor 70 to switch operation of the network service to primary VM 60B or secondary VM 72B on secondary service PIC 52B.

Prior to the ISSU, primary VM 60A on primary service PIC 52A may be configured to operate as the master virtual machine that controls operation of the network services for the pair of service PICs 52. Primary VM 60B on secondary service PIC 52B may be configured to operate as a backup virtual machine to primary VM 60A. For example, as a backup virtual machine, primary VM 60B on secondary service PIC 52B may continually synchronize with primary VM 60A via PFE 48A to update state information 64B and network service applications 66B from primary VM 60A on primary service PIC 52A. If primary VM 60A on primary service PIC 52A were to fail due to a software failure of guest OS 62A or a hardware failure of primary service PIC 52A, primary VM 60B on secondary service PIC 52B may take over operation of the network services. In this way, primary VM 60B on secondary service PIC 52B may provide high availability to primary service PIC 52A during operation of the network services by primary VM 60A on primary service PIC 52A.

In response to receiving an ISSU request for service PICs 52 of router 20, primary RE 22 may initialize VM manager 58 to control the ISSU process. The ISSU request may be received from, for example, a user or administrator of router 22 via a user interface. In other examples, the ISSU request may be scheduled or preprogrammed to occur without user or administrator involvement. VM manager 58 requests initialization of secondary VM 72A on primary service PIC 52A via hypervisor 68. VM manager 58 also requests initialization of secondary VM 72B on secondary service PIC 52B via hypervisor 70.

Secondary VM 72A on primary service PIC 52A may be configured to operate as a backup virtual machine to primary VM 60A. For example, as a backup virtual machine, secondary VM 72A may continually synchronize with primary VM 60A via shared storage 74 to update state information 64C and network service applications 66C based on state information 64A and network service applications 66A from primary VM 60A. Similarly, secondary VM 72B on secondary service PIC 52B may be configured to operate as a backup virtual machine to primary VM 60B on secondary service PIC 52B, which is in turn a backup virtual machine to primary VM 60A on primary service PIC 52A. For example, as a backup virtual machine, secondary VM 72B on secondary service PIC 52B may continually synchronize with primary VM 60B on secondary service PIC 52B via shared storage 76 to update state information 64D and network service applications 66D based on state information 64B and network service applications 66B from primary VM 60B on secondary service PIC 52B.

Upon initialization, both secondary VM 72A on primary service PIC 52A and secondary VM 72B on secondary service PIC 52B may execute an original guest operating system. For example, secondary VM 72B on secondary service PIC 52B executes guest OS 62D, which is the same software system as guest OS 62A executed on primary VM 60A on primary service PIC 52A and guest OS 62B executed on primary VM 60B on secondary service PIC 52B. To perform the ISSU of service PICs 52, VM manager 58 first upgrades the operating system of secondary VM 72A on primary service PIC 52A to new guest OS 78A. For example, VM manager 58 may install new guest OS 78A onto the newly initialized secondary VM 72A on primary service PIC 52A via hypervisor 68 by copying a disk image from a memory within primary RE 22 or from an external source. For example, if guest OS 62A on primary VM 60A is a first version of an operating system, then new guest OS 78A on secondary VM 72A may be an updated version of the operating system, an entirely new version of the operating system, or an entirely different operating system. Hypervisor 68 may then reboot secondary VM 72A. After secondary VM 72A reboots running new guest OS 78A, hypervisor 68 synchronizes secondary VM 72A with primary VM 60A via shared storage 74. Secondary VM 72A may synchronize by replicating state information 64A from primary VM 60A into state information 64C on secondary VM 72A via shared storage 74.

At this point, primary VM 60A and secondary VM 72A on primary service PIC 52A are executing different operating systems, respectively, guest OS 62A and new guest OS 78A. Primary VM 60B on secondary service PIC 52B, however, is still executing the original operating system guest OS 62B, the same as primary VM 60A on primary service PIC 52A. According to the techniques, primary VM 60B on secondary service PIC 52B executing guest OS 62B continues to provide high availability for primary VM 60A during the ISSU of primary service PIC 52A. In this way, because the ISSU is performed by first updating newly initialized secondary VM 72A on primary service PIC 52A, the redundant operating system of primary VM 60B on secondary service PIC 52A is not destroyed and high availability remains even during the ISSU.

If the ISSU of primary service PIC 52A fails before completion, primary VM 60A and secondary VM 72A may continue executing different operating systems. In this case, if primary VM 60A were to fail due to software or hardware failure, a graceful switchover may not be performed between primary VM 60A and secondary VM 72A on primary service PIC 52A because the virtual machines are running two different operating systems. The techniques described in this disclosure enable a graceful switchover to be performed between primary VM 60A on primary service PIC 52A and primary VM 60B on secondary service PIC 52B because both virtual machines are running the same operating system, guest OS 62A, 62B. In this case, after the switchover from primary VM 60A on primary service PIC 52A to primary VM 60B on secondary service PIC 52B, secondary VM 72B on secondary service PIC 52B provides high availability for primary VM 60B during operation of the network services by primary VM 60B on secondary service PIC 52B.

Figure 3C:
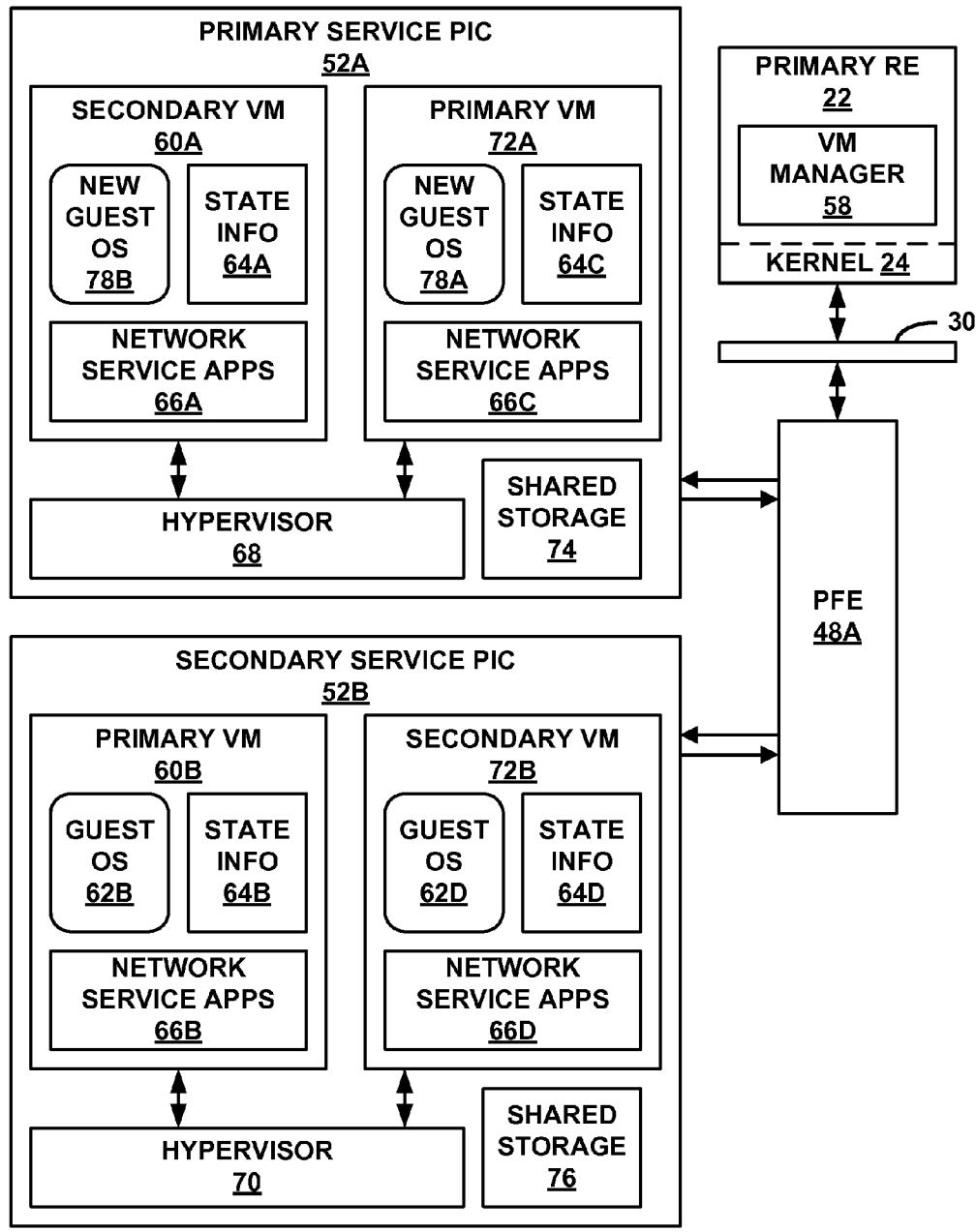

FIG. 3C illustrates primary service PIC 52A after the mastership of primary service PIC 52A and operation of the network services has been transferred from primary VM 60A to secondary VM 72A. After secondary VM 72A is upgraded with new guest OS 78A and synchronized with primary VM 60A, VM manager 58 may instruct hypervisor 68 to switch operation of the network services from primary VM 60A to secondary VM 72A on primary service PIC 52A. The titles of the virtual machines on primary service PIC 52A illustrated in FIG. 3C have been changed to reflect the new primary VM 72A and the new secondary VM 60A.

After the switchover, VM manager 58 may then upgrade the operating system of secondary VM 60A on primary service PIC 52A to new guest OS 78B. New guest OS 78B may be the same operating system as new guest OS 78A executed on primary VM 72A. For example, VM manager 58 may install new guest OS 78B onto secondary VM 60A on primary service PIC 52A via hypervisor 68 by copying a disk image from a memory within primary RE 22 or from an external source. Hypervisor 68 may then reboot secondary VM 60A. After secondary VM 60A reboots running new guest OS 78B, hypervisor 68 synchronizes secondary VM 60A with primary VM 72A via shared storage 74. Secondary VM 60A may synchronize by replicating state information 64C from primary VM 72A into state information 64A on secondary VM 60A via shared storage 74.

At this point, primary VM 72A and secondary VM 60A on primary service PIC 52A are executing the same operating system, new guest OS 78A, 78B. According to the techniques, secondary VM 60A on primary service PIC 52A may provide high availability for primary VM 72A during the ISSU of secondary service PIC 52B. In this way, because primary service PIC 52A includes two virtual machines executing the same operating system, high availability may be provided by primary VM 72A and secondary VM 60A on primary service PIC 52A during the ISSU of secondary service PIC 52B. In this case, if primary VM 72A were to fail after completion of the ISSU of primary service PIC 52A due to either software or hardware failure, the techniques described in this disclosure enable a graceful switchover to be performed between primary VM 72A and secondary VM 60A on primary service PIC 52A because both virtual machines are running the same operating system, new guest OS 78A, 78B.

Figure 3D:
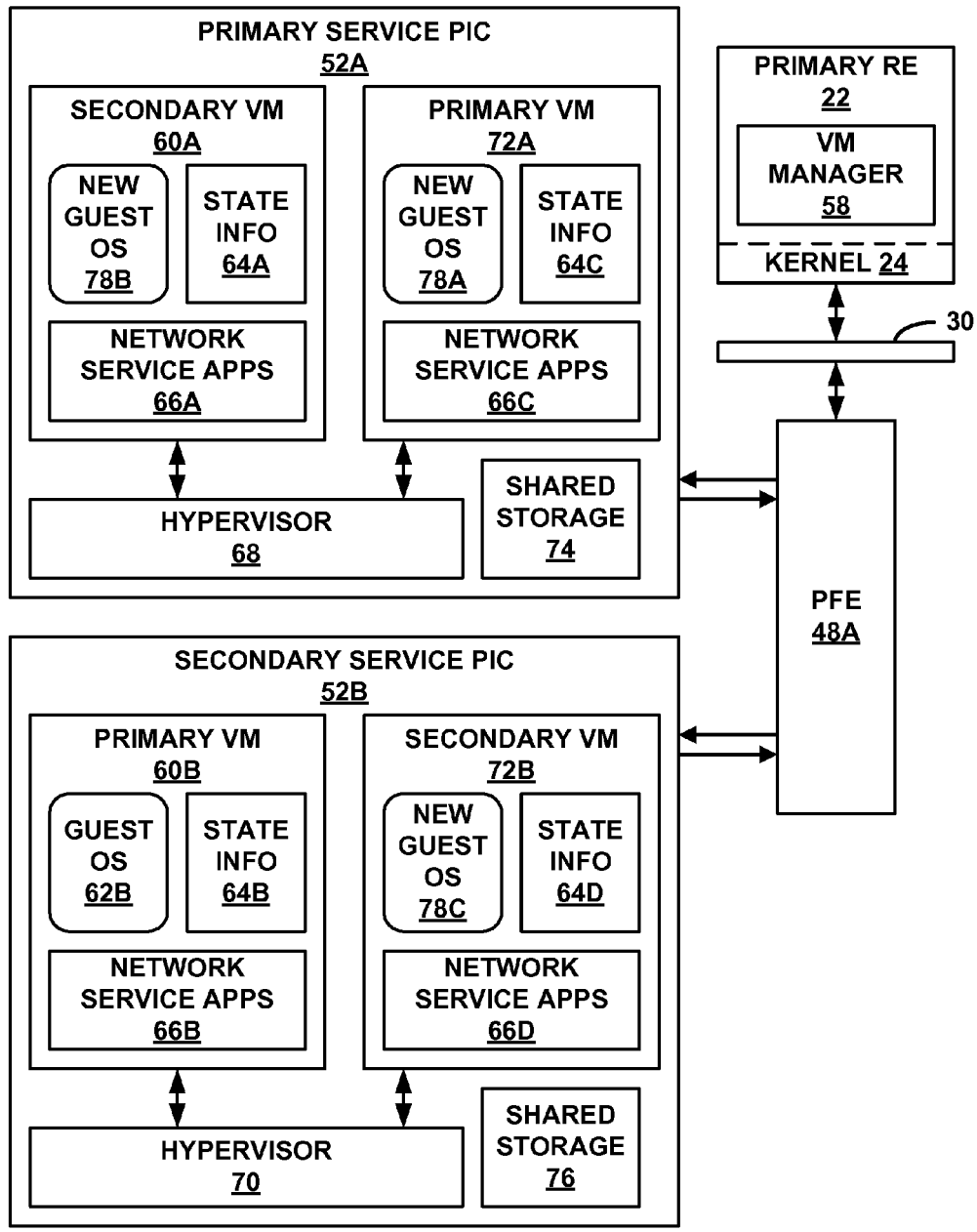

FIG. 3D illustrates secondary service PIC 52B comprising primary VM 60B and secondary VM 72B during the ISSU of secondary service PIC 52B. After completion of the ISSU of primary service PIC 52A, VM manager 58 upgrades the operating system of secondary VM 72B on secondary service PIC 52B to new guest OS 78C. New guest OS 78C may be the same operating system as new guest OS 78A executed on primary VM 72A and new guest OS 78B executed on secondary VM 60A on primary service PIC 52A. For example, VM manager 58 may install new gust OS 78C onto secondary VM 72B on secondary service PIC 52B via hypervisor 70 by copying a disk image from a memory in primary RE 22 or from an external source. Hypervisor 70 may then reboot secondary VM 72B. After secondary VM 72B reboots running new guest OS 78C, hypervisor 70 synchronizes secondary VM 72B with primary VM 60B on secondary service PIC 52B via shared storage 76. Secondary VM 72B may synchronize by replicating state information 64B from primary VM 60B into state information 64D on secondary VM 72B via shared storage 76.

As described above, primary VM 60B operates as a master VM on secondary service PIC 52B, but also operates as a backup VM that synchronizes with primary VM 72A on primary service PIC 52A via PFE 48A. Any information secondary VM 72B replicates from primary VM 60B on secondary service PIC 52B is, therefore, indirectly replicated from primary VM 72A on primary service PIC 52A.

Figure 3E:
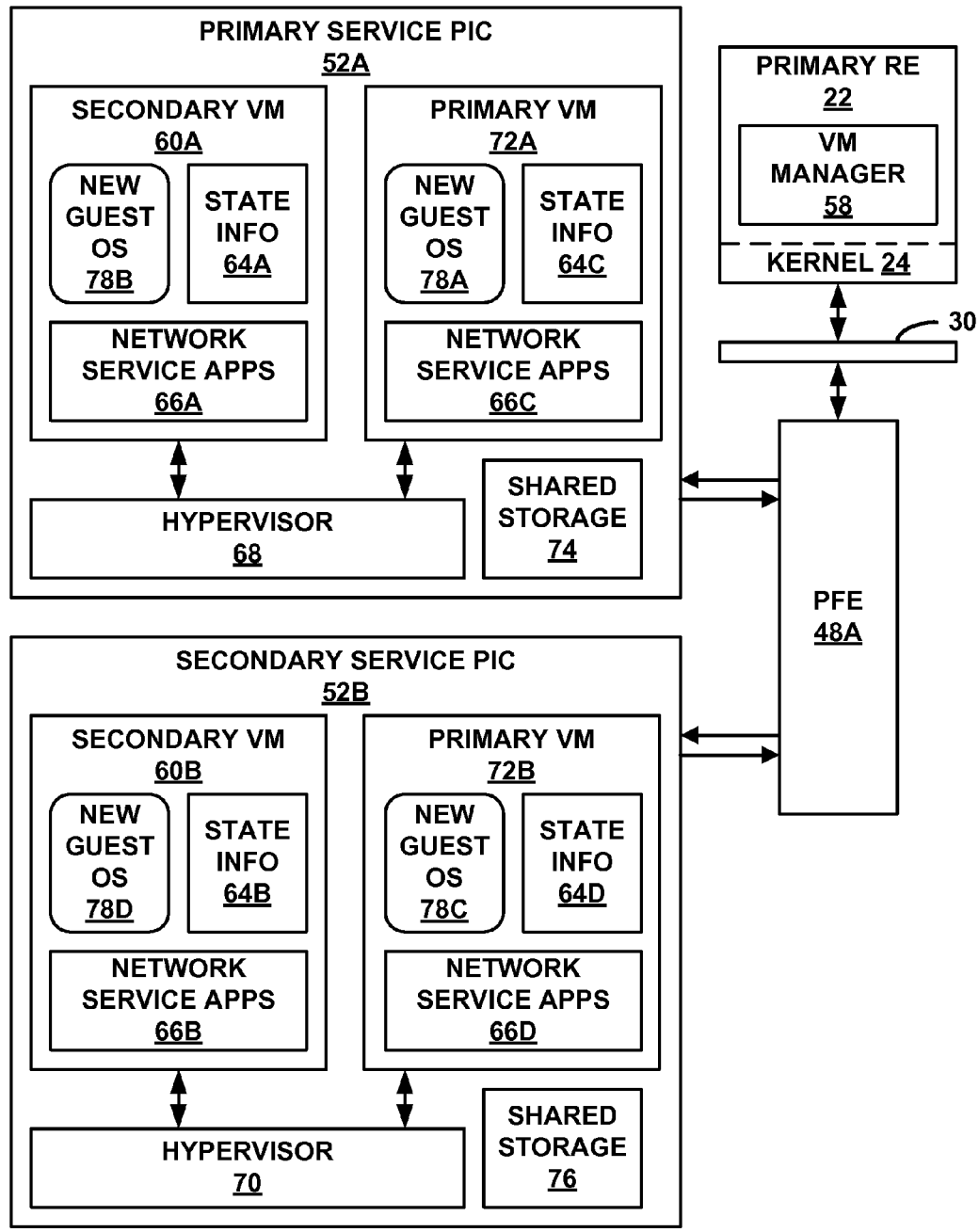

FIG. 3E illustrates secondary service PIC 52B after the mastership of secondary service PIC 52B has been transferred from primary VM 60B to secondary VM 72B. After secondary VM 72B is updated with new guest OS 78C and synchronized with primary VM 60B, VM manager 58 may instruct hypervisor 70 to switch control of secondary service PIC 52B from primary VM 60B to secondary VM 72B on secondary service PIC 52B. The titles of the virtual machines on secondary service PIC 52B illustrated in FIG. 3E have been changed to reflect the new primary VM 72B and the new secondary VM 60B.

After the switchover, VM manager 58 may then upgrade the operating system of secondary VM 60B on secondary service PIC 52B to new guest OS 78D. New guest OS 78D may be the same operating system as new guest OS 78A executed on primary VM 72A on primary service PIC 52A, new guest OS 78B executed on secondary VM 60A on primary service PIC 52A, and new guest OS 78C executed on primary VM 72B on secondary service PIC 52B. For example, VM manager 58 may install new guest OS 78D onto secondary VM 60B on secondary service PIC 52B via hypervisor 70 by copying a disk image from a memory within primary RE 22 or from an external source. Hypervisor 70 may then reboot secondary VM 60B. After secondary VM 60B reboots running new guest OS 78D, hypervisor 70 synchronizes secondary VM 60B with primary VM 72B on secondary service PIC 52B via shared storage 76. Secondary VM 60B may synchronize by replicating state information 64D from primary VM 72B into state information 64C on secondary VM 60B via shared storage 76.

Primary VM 72B operates as a master VM on secondary service PIC 52B, but also operates as a backup VM that synchronizes with primary VM 72A on primary service PIC 52A via PFE 48A. Any information secondary VM 60B replicates from primary VM 72B on secondary service PIC 52B is, therefore, indirectly replicated from primary VM 72A on primary service PIC 52A.

At this point, the ISSU of both primary service PIC 52A and secondary service PIC 52B is complete and all the virtual machines are executing the same operating system, new guest OS 78A-78D. VM manager 58 on primary RE 58 may then instruct hypervisor 68 to terminate secondary VM 60A on primary service PIC 52A, and also instruct hypervisor 70 to terminate secondary VM 60B on secondary service PIC 52B.

Figure 3F:
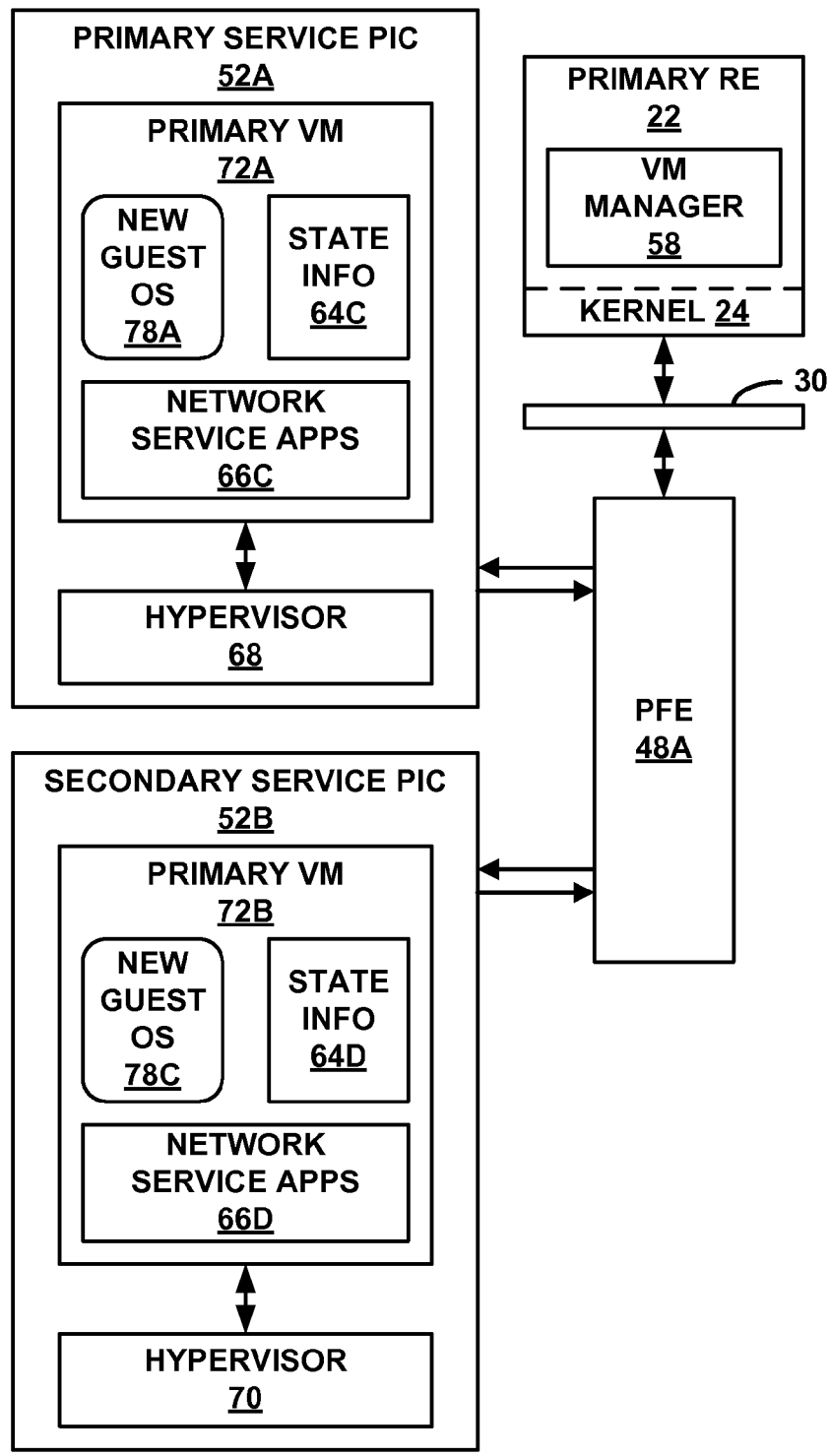

FIG. 3F illustrates primary service PIC 52A with primary VM 72A and secondary service PIC 52B with primary VM 72B after the ISSU of service PICs 52 is complete, and secondary VM 60A and secondary VM 60B have been terminated. At this point, primary VM 72A on primary service PIC 52A and primary VM 72B on secondary service PIC 52B are both executing the same operating system, new guest OS 78A, 78C. Primary VM 72B on secondary service PIC 52B provides high availability for primary VM 72A on primary service PIC 52A during operation of the network services by primary VM 72A on primary service PIC 52A.

As illustrated in FIGS. 3A-3F, the techniques described herein enable an ISSU to be performed on dual appliances within a router while providing high availability for the router during the entire ISSU process.

Figure 4:
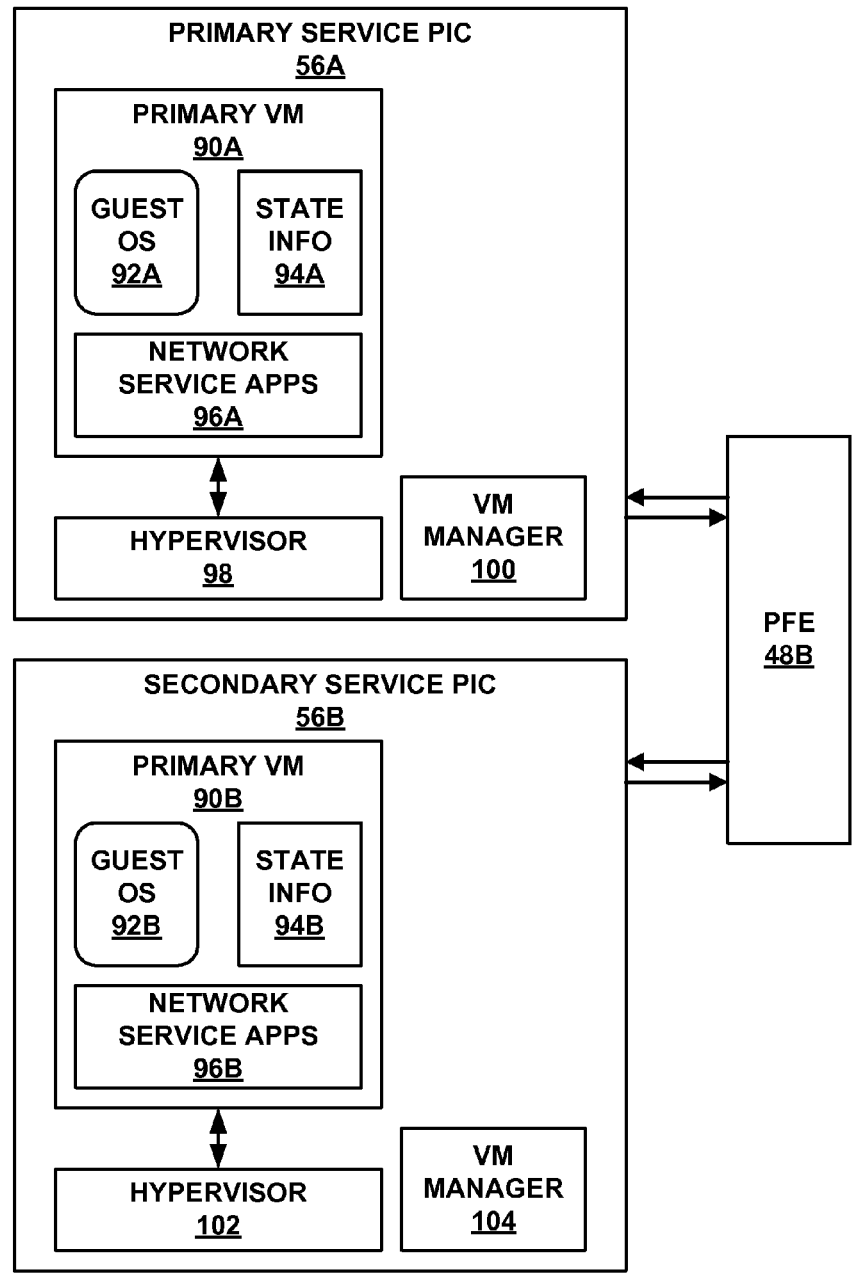
FIG. 4 is a block diagram illustrating another example of a primary service physical interface card and a secondary service physical interface card of a router configured to perform an in-service software upgrade with high availability.

FIG. 4 is a block diagram illustrating another example of a primary service PIC 56A and a secondary service PIC 56B of router 20 configured to perform an in-service software upgrade with high availability. Primary service PIC 56A and secondary service PIC 56B may operate substantially similar as primary service PIC 52A and secondary service PIC 52B from FIGS. 3A-3F.

As illustrated in FIG. 4, primary and secondary service PICs 56 are connected via PFE 48B. In the illustrated example, primary service PIC 56A includes a VM manager 100 capable of initializing, terminating, and otherwise managing virtual machine instances within primary service PIC 56A. VM manager 100 manages the virtual machine instances through a hypervisor 98 within primary service PIC 56A. In some cases, VM manager 100 may be incorporated in hypervisor 100. In addition, secondary service PIC 56B includes a VM manager 104 capable of initializing, terminating, and otherwise managing virtual machine instances within secondary service PIC 56B. VM manager 104 manages the virtual machine instances through a hypervisor 102 within secondary service PIC 56B. In some cases, VM manager 104 may be incorporated in hypervisor 102.

As illustrated in FIG. 4, primary service PIC 56A of router 20 including a primary VM 90A and secondary service PIC 56B including a primary VM 90B. Primary VM 90A on primary service PIC 56A and primary VM 90B on secondary service PIC 56B may have a master/backup relationship. For example, primary VM 90A may be configured by VM manager 100 via hypervisor 98 to operate as the master virtual machine for the pair of service PICs 52 upon start-up on primary service PIC 56A. Similarly, primary VM 90B may be configured by VM manager 104 via hypervisor 102 to operate as the backup virtual machine for the pair of service PICs 56 upon start-up on secondary service PIC 56B.

An ISSU of service PICs 56 with high availability may be performed as described above in FIGS. 3A-3F for service PICs 52, except that the virtual machine instances will not be managed by a VM manager within primary RE 22. Instead, the virtual machine initialization, termination, and management is performed by VM manager 100 for primary service PIC 56A, and performed by VM manager 104 for secondary service PIC 56B.

Figure 5:
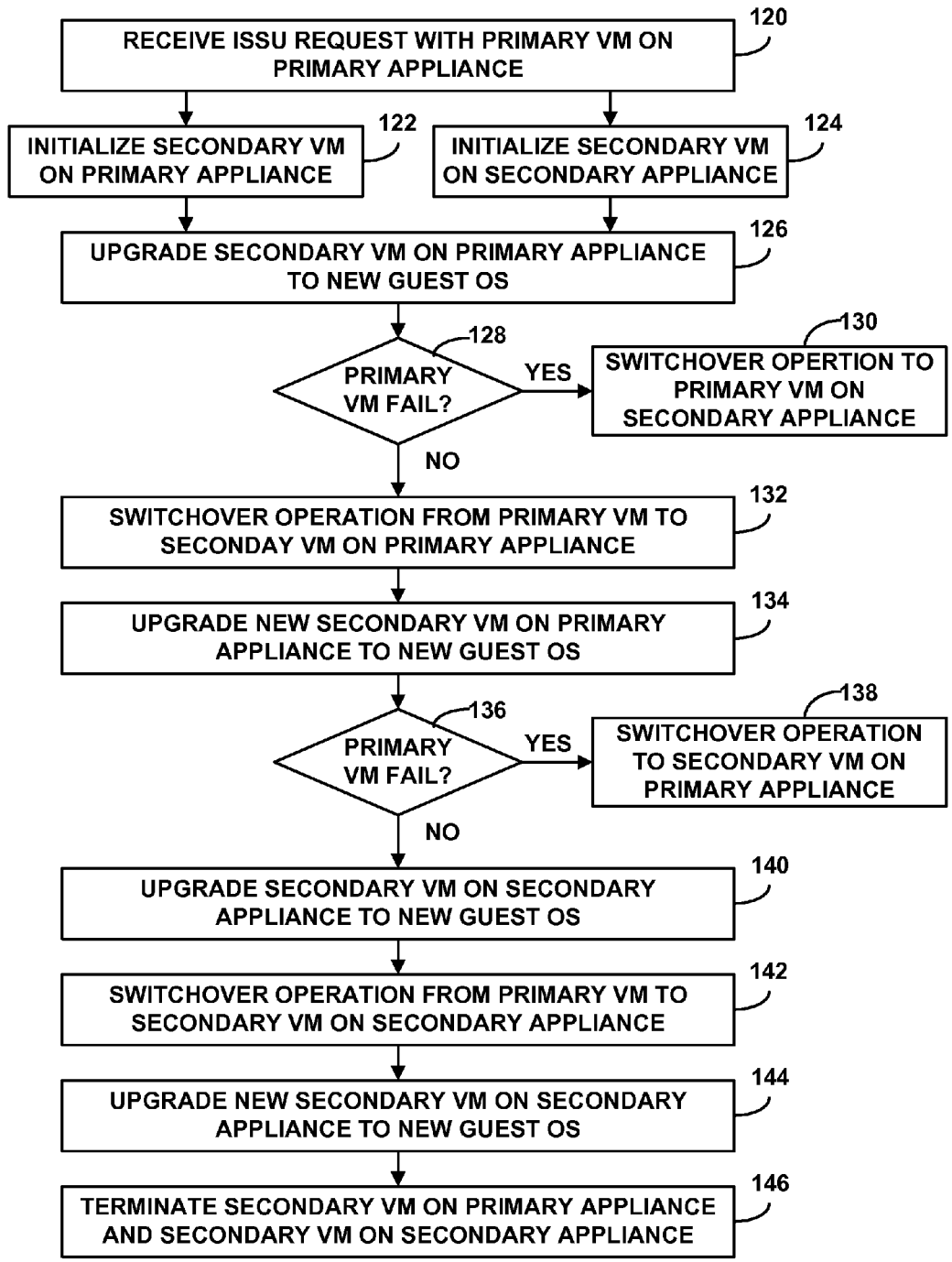
FIG. 5 is a flowchart illustrating an exemplary operation of a router with dual appliances during an in-service software upgrade with high availability.

FIG. 5 is a flowchart illustrating an exemplary operation of a router with dual appliances, e.g., dual routing engines or a pair of service PICs, during an in-service software upgrade with high availability. The illustrated operation will be described with respect to the dual appliances of primary service PIC 52A and secondary service PIC 52B of router 20 of FIGS. 3A-3F. Prior to an ISSU on primary service PIC 52A, primary VM 60A on primary service PIC 52A and secondary VM 60B on secondary service PIC 52B both execute the same operating system, guest OS 62A, 62B, such that primary VM 60B on secondary service PIC 52B provides high availability to primary VM 60A on primary service PIC 52A.

An ISSU process is initiated when primary VM 60A running on primary service PIC 52A of router 20 receives an ISSU request (120). In the example illustrates in FIGS. 3A-3F, primary VM 60A receives the ISSU request via VM manager 58 within primary RE 22 of router 20. Primary RE 22 may receive the ISSU request from an administrator via a user interface. In other examples, a VM manager within primary VM 60A may receive the ISSU request from primary RE 22 or directly from an administrator via a user interface.

In response to receiving the ISSU request, VM manager 60A instructs hypervisor 68 to initialize secondary VM 72A on primary service PIC 52A (122). VM manager 58 also instructs hypervisor 70 to initialize secondary VM 72B on secondary service PIC 52B (124). Both secondary VM 72A on primary service PIC 52A and secondary VM 72B on secondary service PIC 52B may execute the original operating system upon initialization. For example, secondary VM 72B on secondary service PIC 52B executes guest OS 62D, which is the same operating system as guest OS 62A executed on primary VM 60A on primary service PIC 52A and guest OS 62B executed on secondary VM 60B on secondary service PIC 52B.

To perform the ISSU of primary service PIC 52A, VM manager 58 first upgrades secondary VM 72A on primary service PIC 52A to new guest OS 78A (126). New guest OS 78A may comprise a new version of guest OS 62A. After secondary VM 72A reboots, secondary VM 72A synchronizes with primary VM 60A via shared storage 74. For example, secondary VM 72A may replicate state information 64A from primary VM 60A to state information 64C on secondary VM 72A via shared storage 74.

At this point, primary VM 60A and secondary VM 72A on primary service PIC 52A are executing different operating systems, respectively, guest OS 62A and new guest OS 78A. According to the techniques, primary VM 60B on secondary service PIC 52B executing guest OS 62B provides high availability for primary VM 60A on primary service PIC 52A during the ISSU of primary service PIC 52A. If primary VM 60A fails before completion of the ISSU of primary service PIC 52A (YES branch of 128), operation of the network services may be switched from primary VM 60A on primary service PIC 52A to primary VM 60B on secondary service PIC 52B because both virtual machines are running the same operating system (130).

If primary VM 60A does not fail (NO branch of 128), VM manager 58 may continue the ISSU of primary service PIC 52A by switching operation of the network services from primary VM 60A to secondary VM 72A on primary service PIC 52A via hypervisor 68 (132). After the switchover, VM manager 58 may then upgrade new secondary VM 60A on primary service PIC 52A to execute new guest OS 78B (134). At this point, primary VM 72A and secondary VM 60A on primary service PIC 52A are both executing the same operating system, new guest OS 78A, 78B. According to the techniques, secondary VM 60A on primary service PIC 52A may provide high availability for primary VM 72A during operation of the network services by primary VM 72A on primary service PIC 52A. If primary VM 72A fails after completion of the ISSU of primary service PIC 52A (YES branch of 136), operation of the network services may be switched from primary VM 72A to secondary VM 60A on primary service PIC 52A because both virtual machines are running the same operating system, new gust OS 78A, 78B (138).

If primary VM 72A does not fail (NO branch of 136), VM manager 58 may perform the ISSU of secondary service PIC 52B. VM manager 58 upgrades secondary VM 72B on secondary service PIC 52B to execute new guest OS 78C (140). After secondary VM 72B reboots, secondary VM 72B synchronizes with primary VM 60B via shared storage 76. For example, secondary VM 72B may replicate state information 64B from primary VM 60B to state information 64D on secondary VM 72B via shared storage 76. As described above, primary VM 60B operates as a master VM on secondary service PIC 52B, but also operates as a backup VM that synchronizes with primary VM 72A on primary service PIC 52A via PFE 48A.

After synchronization, VM manager 58 may then continue the ISSU of secondary service PIC 52B by switching the mastership of secondary service PIC 52B from primary VM 60B to secondary VM 72B on secondary service PIC 52B via hypervisor 70 (142). After the switchover, VM manager 58 may then upgrade new secondary VM 60B on secondary service PIC 52B to execute new gust OS 78D (144).

At this point, the ISSU of both primary service PIC 52A and secondary service PIC 52B is complete and all the virtual machines are executing the same operating system, new guest OS 78A-78D. VM manager 58 on primary RE 22 may then instruct hypervisor 78 to terminate secondary VM 60A on primary service PIC 52A, and instruct hypervisor 70 to terminate secondary VM 60B on secondary service PIC 52B (146). After termination, primary VM 72A on primary service PIC 52A and primary VM 72B on secondary service PIC 52B are both executing the same operating system, new guest OS 78A, 78C. Primary VM 72B on secondary service PIC 52B may provide high availability for primary VM 72A on primary service PIC 52A during operation of the network services by primary VM 72A on primary service PIC 52A.

In the above examples, the techniques for ISSU with high availability using virtual machines are described as being performed on appliances within a physical device, e.g., router 20 included in a physical network. In other examples, the techniques may be performed on appliances within a virtual device included in a virtual network. A virtual network or modeled network may be used to conduct testing of the disclosed ISSU techniques and other techniques within a virtual device prior to implementation within a physical device. The virtual network may be constructed to model certain network conditions in order to test how the disclosed ISSU techniques or other techniques within a network device may react. Moreover, the virtual device may be construed to test how the disclosed ISSU techniques or other techniques react during different device failures, e.g., software and hardware failures. In some example, the virtual network and/or virtual device may also be used for teaching purposes.

Various examples of the invention have been described. These and other examples are within the scope of the following claims.

The invention claimed is:

1. A method comprising:
    running a first primary virtual machine (VM) on a primary appliance of a network device, wherein the first primary VM executes a first operating system that controls functionality of the primary appliance;
    running a second primary VM on a secondary appliance of the network device, wherein the second primary VM on the secondary appliance executes the first operating system and provides high availability for the primary appliance;
    in response to receiving an in-service software upgrade (ISSU) request, initializing a first secondary VM on the primary appliance and a second secondary VM on the secondary appliance, wherein each of the first secondary VM and the second secondary VM execute the first operating system;
    performing the ISSU on the primary appliance by upgrading the first secondary VM on the primary appliance to a second operating system, switching control of the primary appliance from the first primary VM to the first secondary VM, and upgrading the first primary VM to the second operating system, wherein, during the ISSU of the primary appliance when the first primary VM and the first secondary VM on the primary appliance are executing different operating systems, the second primary VM executing the first operating system on the secondary appliance provides high availability for the primary appliance; and
    if the first primary VM on the primary appliance fails during the ISSU of the primary appliance when the first primary VM and the first secondary VM on the primary appliance are executing different operating systems, switching control of the functionality of the primary appliance from the first primary VM on the primary appliance to the second primary VM on the secondary appliance, wherein the second secondary VM on the secondary appliance provides high availability for the secondary appliance.

2. The method of claim 1, wherein the primary appliance comprises a primary routing engine that controls routing functionality for the network device, and wherein the secondary appliance comprises a secondary routing engine that provides high availability for the primary routing engine.

3. The method of claim 1, wherein the primary appliance comprises a primary service physical interface card (PIC) that performs network services on packets received by the network device, and wherein the secondary appliance comprises a secondary service PIC that provides high availability for the primary service PIC.

4. The method of claim 3, further comprising managing the virtual machines on the primary service PIC and the secondary service PIC using a virtual machine manager executing on a control unit of the network device.

5. The method of claim 3, further comprising managing the virtual machines on the primary service PIC using a first virtual machine manager executing on the primary service PIC, and managing the virtual machines on the secondary service PIC using a second virtual machine manager executing on the secondary service PIC.

6. The method of claim 3, wherein the network services performed by the primary service PIC comprise one or more of firewall services and packet processing services including intrusion detection and prevention (IDP), packet flow monitoring, and authentication services.

7. The method of claim 1, wherein upgrading the first secondary VM on the primary appliance comprises:
    installing the second operating system on the first secondary VM;
    rebooting the first secondary VM; and
    synchronizing the first secondary VM with the first primary VM on the primary appliance by replicating state information from the first primary VM onto the first secondary VM via a shared storage between the first primary VM and the first secondary VM on the primary appliance.

8. The method of claim 1, wherein, when the ISSU on the primary appliance is complete, the first primary VM executing the second operating system on the primary appliance provides high availability for the primary appliance.

9. The method of claim 1, further comprising, when the ISSU of the primary appliance is complete, performing the ISSU on the secondary appliance by upgrading the second secondary VM to the second operating system, switching control of the secondary appliance from the second primary VM to the second secondary VM, and upgrading the second primary VM to the second operating system.

10. The method of claim 9, wherein upgrading the second secondary VM on the secondary appliance comprises:
    installing the second operating system on the second secondary VM;
    rebooting the second secondary VM; and
    synchronizing the second secondary VM with the second primary VM on the secondary appliance by replicating state information from the second primary VM onto the second secondary VM via a shared storage between the second primary VM and the second secondary VM on the secondary appliance, wherein the second primary VM synchronizes with the first secondary VM on the primary appliance.

11. The method of claim 9, wherein, when the ISSU of the secondary appliance is complete, the second primary VM on the secondary appliance provides high availability for the secondary appliance.

12. The method of claim 9, further comprising, when the ISSU of the secondary appliance is complete, terminating the first primary VM on the primary appliance and terminating the second primary VM on the secondary appliance.

13. The method of claim 1,
    wherein the first primary VM on the primary appliance comprises a master VM and the first secondary VM on the primary appliance comprises a backup VM that synchronizes with the first primary VM,
    wherein the second primary VM on the secondary appliance comprises a backup VM that synchronizes with the first primary VM on the primary appliance, and
    wherein the second primary VM on the secondary appliance also comprises a master VM of the secondary appliance and the second secondary VM on the secondary appliance comprises a backup VM that synchronizes with the second primary VM.

14. A network device comprising one or more processors configured to operate as:
   a primary appliance;
   a secondary appliance;
   a first hypervisor that runs one or more virtual machines on the primary appliance;
   a second hypervisor that runs one or more virtual machines on the secondary appliance;
   a first primary virtual machine (VM) running on the primary appliance, wherein the first primary VM is configured to execute a first operating system that controls functionality of the primary appliance; and
   a second primary VM running on the secondary appliance, wherein the second primary VM is configured to execute the first operating system and provide high availability for the primary appliance,
   wherein, in response to receiving an in-service software upgrade (ISSU) request, the first hypervisor initializes a first secondary VM on the primary appliance and the second hypervisor initializes a second secondary VM on the secondary appliance, wherein each of the first secondary VM and the second secondary VM execute the first operating system,
   wherein the first hypervisor performs the ISSU on the primary appliance to upgrade the first secondary VM to a second operating system, switch control of the primary appliance from the first primary VM to the first secondary VM, and upgrade the first primary VM to the second operating system, wherein, during the ISSU of the primary appliance when the first primary VM and the first secondary VM on the primary appliance are executing different operating systems, the second primary VM executing the first operating system on the secondary appliance provides high availability for the primary appliance, and
   wherein, if the first primary VM on the primary appliance fails during the ISSU of the primary appliance when the first primary VM and the first secondary VM on the primary appliance are executing different operating systems, the first and second hypervisors switch control of the functionality of the primary appliance from the first primary VM on the primary appliance to the second primary VM on the secondary appliance, wherein the second secondary VM on the secondary appliance provides high availability for the secondary appliance.

15. The network device of claim 14, wherein the primary appliance comprises a primary routing engine that controls routing functionality for the network device, and wherein the secondary appliance comprises a secondary routing engine that provides high availability for the primary routing engine.

16. The network device of claim 14, wherein the primary appliance comprises a primary service physical interface card (PIC) that performs network services on packets received by the network device, and wherein the secondary appliance comprises a secondary service PIC that provides high availability for the primary service PIC.

17. The network device of claim 16, wherein the processors are configured to operate as a control unit of the network device executing a virtual machine manager configured to manage the virtual machines on the primary service PIC and the secondary service PIC.

18. The network device of claim 16,
   wherein the primary service PIC executes a first virtual machine manager configured to manage the virtual machines on the primary service PIC, and
   wherein the secondary service PIC executes a second virtual machine manager configured to manage the virtual machines on the secondary service PIC.

19. The network device of claim 16, wherein the network services performed by the primary service PIC comprise one or more of firewall services and packet processing services including intrusion detection and prevention (IDP), packet flow monitoring, and authentication services.

20. The network device of claim 14, wherein the first hypervisor upgrades the first secondary VM on the primary appliance by:
   installing the second operating system on the first secondary VM;
   rebooting the first secondary VM; and
   synchronizing the first secondary VM with the first primary VM on the primary appliance by replicating state information from the first primary VM onto the first secondary VM via a shared storage between the first primary VM and the first secondary VM on the primary appliance.

21. The network device of claim 14, wherein, when the ISSU of the primary appliance is complete, the first primary VM executing the second operating system on the primary appliance provides high availability for the primary appliance.

22. The network device of claim 14, wherein, when the ISSU on the primary appliance is complete, the second hypervisor performs the ISSU on the secondary appliance to upgrade the second secondary VM to the second operating system, switch control of the secondary appliance from the second primary VM to the second secondary VM, and upgrade the second primary VM to the second operating system.

23. The network device of claim 22, wherein the second hypervisor upgrades the second secondary VM on the secondary appliance by:
   installing the second operating system on the second secondary VM;
   rebooting the second secondary VM; and
   synchronizing the second secondary VM with the second primary VM on the secondary appliance by replicating state information from the second primary VM onto the second secondary VM via a shared storage between the second primary VM and the second secondary VM on the secondary appliance, wherein the second primary VM synchronizes with the first secondary VM on the primary appliance.

24. The network device of claim 22, wherein, when the ISSU of the secondary appliance is complete, the second secondary VM on the secondary appliance provides high availability for the secondary appliance.

25. The network device of claim 22, wherein, when the ISSU of the secondary appliance is complete, the first hypervisor terminates the first primary VM on the primary appliance, and the second hypervisor terminates the second primary VM on the secondary appliance.

26. The network device of claim 14,
   wherein the first primary VM on the primary appliance comprises a master VM and the first secondary VM on the primary appliance comprises a backup VM that synchronizes with the first primary VM,
   wherein the second primary VM on the secondary appliance comprises a backup VM that synchronizes with the first primary VM on the primary appliance, and
   wherein the second primary VM on the secondary appliance also comprises a master VM of the secondary appliance and the second secondary VM on the secondary appliance comprises a backup VM that synchronizes with the second primary VM.

27. A non-transitory, computer-readable storage medium comprising instructions that cause one or more programmable processors to:
- run a first primary virtual machine (VM) on a primary appliance of a network device, wherein the first primary VM executes a first operating system that controls functionality of the primary appliance;
- run a second primary VM on a secondary appliance of the network device, wherein the second primary VM on the secondary appliance executes the first operating system and provides high availability for the primary appliance;
- in response to receiving an in-service software upgrade (ISSU) request, initialize a first secondary VM on the primary appliance and a second secondary VM on the secondary appliance, wherein each of the first secondary VM and the second secondary VM execute the first operating system;
- perform the ISSU on the primary appliance by upgrading the first secondary VM on the primary appliance to a second operating system, switch control of the primary appliance from the first primary VM to the first secondary VM, and upgrade the first primary VM to the second operating system, wherein, during the ISSU of the primary appliance when the first primary VM and the first secondary VM on the primary appliance are executing different operating systems, the second primary VM executing the first operating system on the secondary appliance provides high availability for the primary appliance; and
- if the first primary VM on the primary appliance fails during the ISSU of the primary appliance when the first primary VM and the first secondary VM on the primary appliance are executing different operating systems, switch control of the functionality of the primary appliance from the first primary VM on the primary appliance to the second primary VM on the secondary appliance, wherein the second secondary VM on the secondary appliance provides high availability for the secondary appliance.

* * * * *